(12) United States Patent
Falk et al.

(10) Patent No.: US 11,995,841 B2
(45) Date of Patent: May 28, 2024

(54) FOUR-DIMENSIONAL CRANE RAIL MEASUREMENT SYSTEMS

(71) Applicant: FALK PLI ENGINEERING & SURVEYING, INC., Portage, IN (US)

(72) Inventors: Michael O. Falk, Portage, IN (US); Sagar Deshpande, Big Rapids, MI (US); Zhengwei Davis Zhang, Burns Harbor, IN (US); Nathan Plooster, Michigan City, IN (US)

(73) Assignee: Falk PLI Engineering & Surveying, Inc., Portage, IN (US)

( * ) Notice: Subject to any disclaimer, the term of this patent is extended or adjusted under 35 U.S.C. 154(b) by 0 days.

(21) Appl. No.: 17/306,576

(22) Filed: May 3, 2021

(65) Prior Publication Data

US 2021/0256706 A1  Aug. 19, 2021

Related U.S. Application Data

(63) Continuation-in-part of application No. 17/029,656, filed on Sep. 23, 2020, now Pat. No. 11,506,565.

(Continued)

(51) Int. Cl.
  *G06T 7/13* (2017.01)
  *B66C 6/00* (2006.01)
  (Continued)

(52) U.S. Cl.
  CPC .............. *G06T 7/13* (2017.01); *B66C 6/00* (2013.01); *G06T 3/02* (2024.01); *G06T 7/74* (2017.01);
  (Continued)

(58) Field of Classification Search
  CPC .......... G06T 7/13; G06T 3/0006; G06T 7/74; G06T 17/20; G06T 2207/10028;
  (Continued)

(56) References Cited

U.S. PATENT DOCUMENTS 3,123,330 A   3/1964  Forbes-Robinson
5,419,521 A   5/1995  Matthews
(Continued)

FOREIGN PATENT DOCUMENTS

CN   106643545 B   * 10/2018
EP      2499454       9/2012
(Continued)

OTHER PUBLICATIONS

Machine translation of CN106643545B (Year: 2018).*
(Continued)

*Primary Examiner* — Alexander Satanovsky
*Assistant Examiner* — Sangkyung Lee
(74) *Attorney, Agent, or Firm* — Stradley Ronon Stevens & Young, LLP

(57) ABSTRACT

A method and system for conducting a non-contact survey of an overhead crane runway system using a survey apparatus that is alternately located in the crane bay or on a crane bridge girder. Disclosed more particularly are a method and system for testing an overhead crane runway beam 3D alignment or an overhead crane runway rail 3D alignment using a 3D laser scanner.

9 Claims, 22 Drawing Sheets

Related U.S. Application Data

(60) Provisional application No. 62/904,824, filed on Sep. 24, 2019.

(51) Int. Cl.
  G06T 3/02 (2024.01)
  G06T 7/73 (2017.01)
  G06T 17/20 (2006.01)

(52) U.S. Cl.
  CPC ........ *G06T 17/20* (2013.01); *B66C 2700/012* (2013.01); *B66C 2700/0328* (2013.01); *G06T 2207/10028* (2013.01); *G06T 2207/20056* (2013.01); *G06T 2207/20164* (2013.01)

(58) Field of Classification Search
  CPC ............ G06T 2207/20164; B66C 6/00; B66C 2700/012; B66C 2700/0328
  See application file for complete search history.

(56) References Cited

U.S. PATENT DOCUMENTS

| | | | |
|---|---|---|---|
| 5,963,749 A | 10/1999 | Nicholson | |
| 7,428,781 B2 | 9/2008 | Wickhart | |
| 7,561,990 B2 | 7/2009 | Lewis et al. | |
| 7,774,381 B2 | 8/2010 | Kothuri et al. | |
| 7,804,498 B1 | 9/2010 | Graham et al. | |
| 8,314,390 B2 | 11/2012 | Micko | |
| 8,354,643 B2 | 1/2013 | Micko | |
| 8,393,214 B2 | 3/2013 | Ruile et al. | |
| 8,410,774 B2 | 4/2013 | Yang et al. | |
| 8,416,094 B2 | 4/2013 | Dery et al. | |
| 8,631,701 B2 | 1/2014 | Chiba et al. | |
| 8,854,544 B2 | 10/2014 | Wong | |
| 8,938,160 B2 | 1/2015 | Wang | |
| 9,534,730 B2 | 1/2017 | Black et al. | |
| 9,726,516 B2 | 8/2017 | Carbone et al. | |
| 9,784,579 B2 | 10/2017 | Sunio et al. | |
| 9,789,393 B2 | 10/2017 | Adachi et al. | |
| 9,863,767 B2 | 1/2018 | Fuchikami et al. | |
| 9,900,669 B2 | 2/2018 | Touma et al. | |
| 9,983,025 B2 | 5/2018 | Zuta et al. | |
| 10,157,535 B1 | 12/2018 | Martinez | |
| 10,257,499 B2 | 4/2019 | Hintz et al. | |
| 10,315,781 B2 | 6/2019 | Zhao et al. | |
| 2005/0111012 A1 | 5/2005 | Waisanen | |
| 2007/0171434 A1* | 7/2007 | Wickhart | B66C 7/00 701/19 |

FOREIGN PATENT DOCUMENTS

| | | | |
|---|---|---|---|
| EP | 2910512 B1 | * | 5/2016 |
| JP | 2869741 B2 | * | 3/1999 |
| JP | 2014215296 A | * | 11/2014 |
| KR | 19980052541 A | * | 9/1998 |
| KR | 100199442 B1 | * | 6/1999 |
| KR | 100655936 B1 | * | 12/2006 |
| RU | 2605233 C1 | * | 12/2016 |

OTHER PUBLICATIONS

Machine translation of EP2910512A1 (Year: 2016).*
Machine translation of JP286974B2 (Year: 1999).*
Machine translation of KR100655936B1 (Year: 2006).*
Machine translation of CN109685837A (Year: 2019).*
Machine translation of JP2014215296A (Year: 2014).*
PMC5470794 (Year: 2017).*
Machine translation of RU2605233C1 (Year: 2016).*
Machine translation of KR100199442B1 (Year: 1999).*
Machine translation of KR19980052541A (Year: 1998).*
Anonymous, "Aligning overhead crane rails", Hoist Magazine, 2008, http://www.hoistmagazine.com/features/aligning-overhead-crane-rails/.
Anonymous, "Schematic view of a crane runway rail", 2018, originally published at http://www.rapidrail.co.uk/images/tracktolerancediagramSmall.gif; link no longer active.
Arbi et al., "The Application of Terrestrial Laser Scanner Surveys for Detailed Inspection of Bridges", 7th Australian Small Bridge Conference, 2015, Melbourne, Victoria, pp. 1-12.
Dearborn Crane, "Crucial Dimensions", 2007, http://www.dearborncrane.com/pdf/bridge_cranes/107-Crucial%20Dimensions.pdf.
Demag, "Safety all along the line", 2017, https://www.demagcranes.com/sites/default/files/media/documents/21308444_EN_DE_170831_2.pdf.
Judy, "Spreading Cracks on FIU Bridge Failed to Alarm Project Team", ENR Southeast, 2019, pp. 1-6.
Kremen et al., "Checking Crane Rails by Terrestrial Laser Scanning Technology", LNEC, Lisbon, 2008, pp. 1-10.
Marjetic et al., "An Alternative Approach to Control Measurements of Crane Rails", Sensors, 2012, 12, pp. 5906-5918.
Neumann et al., "Crane rail surveys keep the wheels turning*", World Cargo News, 2009, pp. 20.
Railq, "Runway Survey", 2010, https://f.nordiskemedier.dk/20ihs75bstcbbja.pdf.
Shortis et al., "Alignment of Crane Rails Using a Survey Network", Australian Surveyor, 1995, 40(4), pp. 1-13.
Yan et al., "Automated Damage Detection and Structural Modeling with Laser Scanning", Proceedings of the Annual Stability Conference, 2016, Orlando, Florida, pp. 1-20.
Screen capture from vimeo clip entitled "AEC/RE Pitchathon 2020:Aren", 1 page, uploaded on Jun. 22, 2020 by the user "Shadow Ventures", Retrieved from Internet: <https://vimeo.com/431385830>.

* cited by examiner

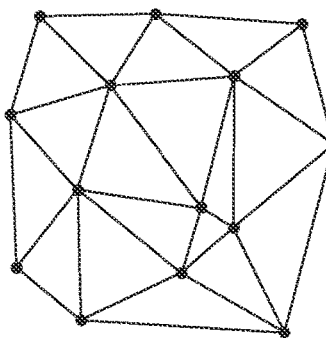
FIG. 3A
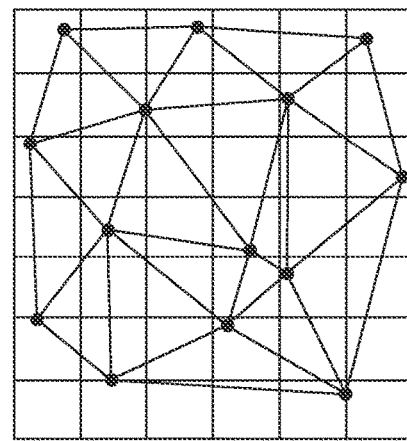
FIG. 3B
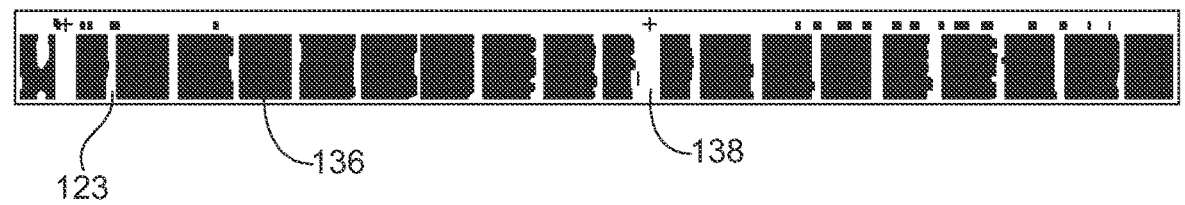
FIG. 4A
FIG. 4B

FOUR-DIMENSIONAL CRANE RAIL MEASUREMENT SYSTEMS

RELATED APPLICATIONS

This application claims the benefit of priority as a continuation-in-part application to U.S. patent application Ser. No. 17/029,656 titled Four-Dimensional Crane Rail Measurement and filed on Sep. 23, 2020, which, in turn, claims priority to U.S. Patent Application No. 62/904,824 titled Four-Dimensional Crane Rail Measurement and filed on Sep. 24, 2019. The contents of both prior applications are incorporated in this application by reference.

TECHNICAL FIELD

The present disclosure relates generally to a method and apparatus for conducting a non-contact overhead crane runway system survey using a survey apparatus that is alternately located in the crane bay or on a crane bridge girder, and, more particularly, to testing an overhead crane runway beam 3D alignment or an overhead crane runway rail 3D alignment using a 3D laser scanner. The data and profiles generated can be reviewed to ascertain whether the overhead rails conform to alignment specifications.

BACKGROUND OF THE DISCLOSURE

An exemplary overhead crane 100, with which exemplary embodiments of the described rail survey system and rail survey data collection methods can be used, is shown in FIG. 1A. The traveling overhead crane 100 may span a distance between two runway rails 101, each runway rail 101 supported by a runway beam 102, and each runway beam 102 supported by a plurality of support columns (not shown). The runway beam 102 generally has an "I" shape as shown in FIG. 1B, with an upper flange 120 upon which the runway rail 101 rests and a lower flange 121 connected to the upper flange 120 via a web 122. The runway beam 102 can be further reinforced with a plurality of stiffeners 123 that are positioned between the upper flange 120 and the lower flange 121 of the runway beam 102 in a plane that is perpendicular to both the flanges 120, 121 and the web 122 and placed at intervals along the runway rail 101.

The overhead crane 100 contacts each of the runway rails 101 with an end carriage 103. Each end carriage 103 includes two or more crane wheels 104 that contact the runway rail 101. For example, each end carriage 103 shown in FIG. 1A includes two crane wheels 104. The leading and trailing ends of each end carriage 103 terminate with a rail sweep 105.

The overhead crane 100 further includes a trolley 106 that receives power through a trolley festoon 116 and travels between the two respective end carriages 103 on a pair of bridge rails 107. Each bridge rail 107 is supported by a bridge girder 108. The bridge girder 108 is driven by a crane motor 118 along the runway rails 101. The trolley 106 may further include one or more hoisting mechanisms 109, each supporting a load hook 110 through a wire rope 115, which can be raised and lowered by each of the respective hoisting mechanisms 109 to raise and lower cargo. Use of the hoisting mechanisms 109 to raise and lower cargo, in combination both with the ability of the trolley 106 to travel back and forth between the two respective end carriages 103 on the bridge rails 107 and with the ability of the overhead crane 100 (as a whole) to travel the length of the crane rails 101, allows crane operators to move cargo between any two locations on the loading dock between the crane rails 101. Operation of the overhead crane 100 can be controlled by a crane operator via a push button pendant 111 connected to a pedant festoon 112 by a pendant cable 113 or, alternatively, via a remote control 114. The pedant festoon 112 and the trolley festoon 116 are slidably suspended from a C-Track 117 positioned along the bridge girder 108. The crane motor 118 is powered through a high TRO reel system 119, which is a type of industrial mobile power feeding system.

Overhead cranes, such as the overhead crane 100 described above, are used in material handling factories and warehouses around the world to load and unload millions of tons of cargo daily and are crucial to the daily operations performed at each of these respective factories and warehouses. Due to the large scale of such overhead cranes and the heavy loads typically transported by the cranes, proper alignment of runway rails and crane wheels is crucial to their safe and efficient operation, and hence crucial to the daily operations of each business in which they are used. Changes to geometric parameters stated in the project documentation arise not only during installation, but especially during operation of the crane. These changes are caused by various influences such as forces affecting the crane when the crane is moving, crane weight, material depreciation, heat influences, and more.

Alignment standards for crane rails are outlined in the Crane Manufacturers Association of America's specification 70 and AISE technical report #13. Many types of rail surveys involve time-consuming methods that require the rail to be locked out (i.e., power to the hot rail turned off) and survey personnel to walk the length of the runway.

Although alignment of the runway rails is important, other factors, such as positioning of the crane wheels parallel to their respective runway rails and/or assuring that drive motor output provided to the respective end carriages is equivalent, are also important. Imbalances in motor output to the respective end carriages can cause crane skew even though the runway rails themselves are within tolerance guidelines. These imbalances result in wear on the rails and crane wheels, both of which are costly to repair. Hence, a safe method to quickly and accurately collect rail survey data and to find the root cause of misalignment problems would be very beneficial.

Previous methods of rail surveying have involved using piano wire for straightening sections of rail. When used in conjunction with a tape measure to measure the span between runway rails, this method is not very accurate and is extremely time consuming. Another common method requires setting a transit on the rail while survey personnel walk the length of the rail, stopping at various points to take readings. Although this is a more accurate approach for determining the straightness of individual runway rails, determining the span between runway rails is still dependent on the use of a tape measure. For measurement of runway rail elevation, yet another instrument is required for set-up on the rail. With few exceptions, the known methods for rail surveying refer primarily to techniques for use on train tracks and elevation tracks which are not applicable for use with respect to overhead cranes.

An alternative method is described in U.S. Pat. No. 7,499,186 issued to MHE Technologies, Inc. and uses a remotely operated laser to perform a runway survey. This device is not configured, however, to measure the relative positioning of the two rails that support the crane bridge girder (e.g., span alignment or elevation). In addition, the existing alignment systems require manpower to access the crane rail runway beam and begin taking measurements on one side of the bay, work their way to the end of the bay, then do the same thing on the other side of the bay. The rail span value is geometrically calculated and is never directly measured. These methods thus result in suspension of crane operation for the duration of the survey, which translates into increased costs and fiscal and efficiency losses.

Overhead cranes are often the heart of operations in a manufacturing facility. Shutting down an overhead crane can and often does shut down operations. Therefore, operators are reluctant to shut down cranes for maintenance or inspections. The problem becomes how operators can maintain and inspect overhead cranes with minimal or, preferably, no downtime. Accordingly, there is a need for a method of surveying rails of overhead cranes which does not require suspension of crane operation.

Existing rail survey systems require down time and human access to the crane rail. In the past, operators would survey, analyze, and repair crane rails during the same outage period. This practice makes the engineering analysis and design repair the scheduling choke point. Prior methods also limited the ability of operators to seek and vet competitive bids from contractors for the repairs; they also limited the material available to use during the outage.

To overcome the shortcomings of existing rail survey systems, a contact-free rail survey system is provided. An object of the present disclosure is to provide a more efficient approach to surveying the rail alignment of an overhead crane. A related object is to eliminate the need for access to the crane runway rails to complete an alignment survey. Another object is to eliminate or significantly shorten the outage period required to complete the survey. Yet another object is to safely, quickly, and accurately measure crane runway rail, runway beam, runway beam flange camber, runway beam web warp and lean, hot rail alignment, column 3D position and lean, column girder seats, and span during normal operations. A related object is to allow measurements to be taken months or weeks before the scheduled downtime, allowing sufficient time for engineering analysis, design, and competitive bidding for repair.

SUMMARY OF THE INVENTION

To achieve these and other objects, and in view of its purposes, the present disclosure provides a non-contact rail survey system for overhead crane runway beams, crane bridge beams, and structural beams used for bridges and the like. Each crane runway beam has an upper flange and a lower flange linked by a beam web, and a plurality of vertical beam web stiffeners positioned along the beam at intervals. A runway rail is positioned on top of the runway beam. A hot rail is positioned along the upper flange of the crane runway beam. Crane columns each have an upper end and a lower end, with the upper end having a beam seat upon which the crane runway beam rests. The system includes a measurement unit configured to remain stationary during measurement of two runway rails which collectively form a runway. The measuring unit includes a 3-D laser scanner configured to collect data, a support base, and an interface which transmits the data collected by the 3D laser scanner. The system further includes a computing unit with a receiver which receives the 3D laser scanner data transmitted by the interface, a data storage unit, and a processor configured to compute one or more of runway rail 3D alignment, crane runway beam 3D alignment, crane runway beam flange camber, crane runway beam web warp and lean, hot rail 3D alignment, crane column 3D position and lean, crane column beam seats, and direct span measurement.

The present disclosure further provides a non-contact method for measuring 3-D alignment of an overhead crane runway beam or runway rail. The method includes the step of providing a measurement unit configured to remain stationary during measurement of two rails which collectively form a runway, wherein the measurement unit includes a 3-D laser scanner on a support base. The method further includes the steps of scanning a part of the actual runway beam or runway rail and creating a cross section of the actual runway beam or runway rail; creating a template cross section of the runway beam or runway rail; trimming the template cross section of the runway beam or runway rail to approximately resemble the shape of the cross section of the actual runway beam or runway rail; identifying salient inflection points on the template cross section of the runway beam or runway rail; implementing a template matching process to orient the template points to the beam or rail points; completing the template matching process on all beam or rail points located within the cross section of the actual runway beam or runway rail; and determining the deviation between the cross section of the crane runway beam or rail and the template beam or rail cross section, wherein when the deviation exceeds a pre-determined threshold the runway beam or rail is not aligned, and wherein when the deviation is at or below the pre-determined threshold the runway beam or rail is aligned. The matching process includes placing the bottom-most salient inflection point on the bottom-most beam or rail point, computing the root-mean-square error (RMSE) of the closest beam or rail points to the salient inflection points, and repeating the computation for all beam or rail points from the bottom to the top; comparing all template points with the beam or rail points to complete dense matching; and using an affine transformation model to orient the template points to the beam or rail points.

It is to be understood that both the foregoing general description and the following detailed description are exemplary, but are not restrictive, of the disclosure.

BRIEF DESCRIPTION OF THE DRAWING

The disclosure is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 3A illustrates an exemplary Triangulated Irregular Network (TIN) surface;

FIG. 3B illustrates a raster grid image produced by conversion of the exemplary TIN surface shown in FIG. 3A;

FIG. 4A is an image showing the different components of a runway beam;

FIG. 4B is a binary image showing the stiffeners and areas (called panels) between adjacent stiffeners on the web of a runway beam;

DETAILED DESCRIPTION OF THE DISCLOSURE

The described rail survey system can be used to survey an overhead crane rail for straightness, span, and elevation. Further, the survey information collected can be used to determine whether an overhead crane is skewed at any measurement point.

Figure 2A:
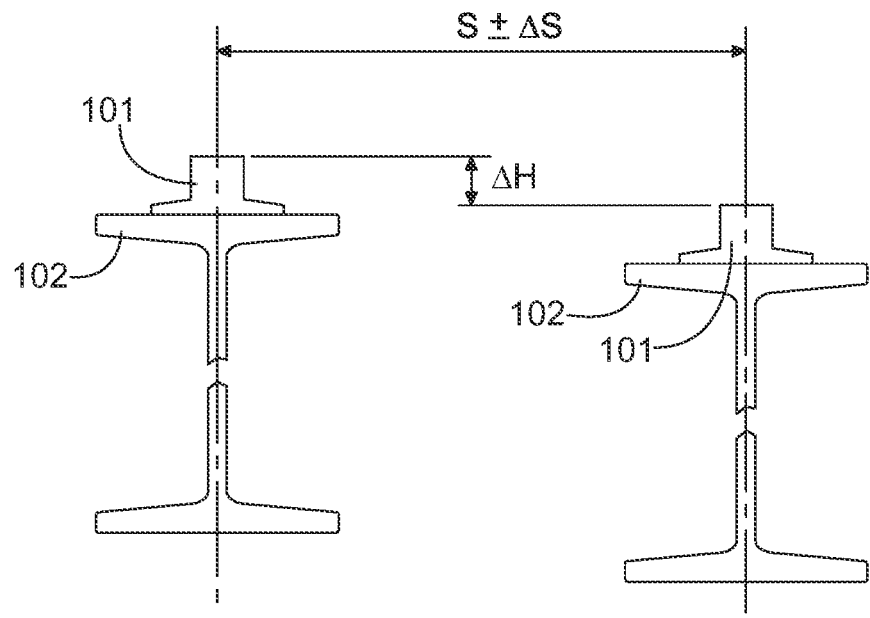
FIG. 2A is a cross-sectional schematic view of a crane runway rail, in position on a runway beam, highlighting the parameters that are measured during an overhead alignment survey.

Referring now to the drawing, in which like reference numbers refer to like elements throughout the various figures that comprise the drawing, FIG. 2A is a cross-sectional schematic view of a crane runway rail 101, in position on a runway beam 102, highlighting the parameters that are measured during an overhead crane rail alignment survey. The parameter $\Delta S$ represents the deviation from the rail span S, which is the horizontal distance between adjacent runway rails 101. The standard permissible $\Delta S$ for rail spans of 15 meters or below is 3 mm, and for wider rail spans 0.25 mm is added for every meter above 15 meters. Therefore, the $\Delta S$ for a 20-meter span is calculated as $3+(5\times0.25)=4.25$ mm up to a maximum of 15 mm.

The parameter $\Delta H$ represents the deviation in height between adjacent runway rails 101, or the vertical alignment deviation between the runway rails 101, which is also reflective of the vertical alignment deviation between the runway beams 102. The standard permissible $\Delta H$ is a maximum of 10 mm.

Figure 2B:
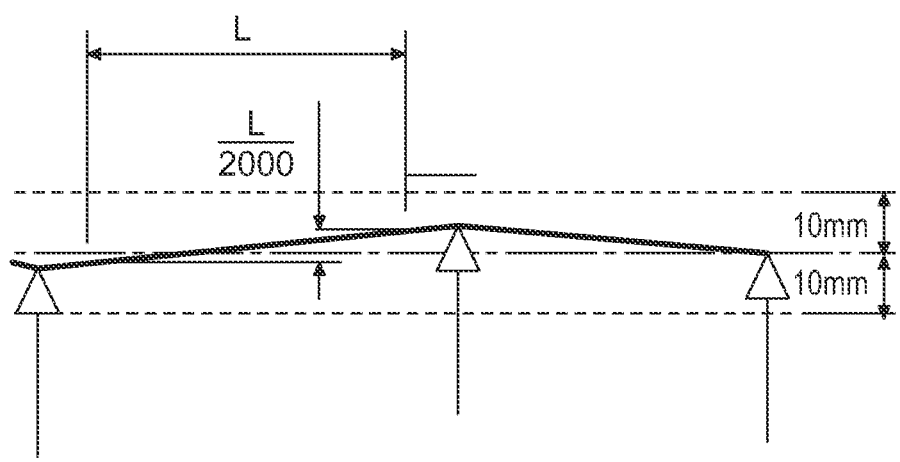
FIG. 2B is a top schematic view of the permissible deviation in track straightness of the crane runway rail, in position on the runway beam, in the horizontal and vertical planes.

FIG. 2B is a top schematic view of the permissible deviation in track straightness of the crane runway rail 101, in position on the runway beam 102, in the horizontal and vertical planes. The local vertical or horizontal deviation at any point of the track should not be greater than L/2000, measured over a length L of not less than 2 meters on a line parallel to the theoretical datum as shown (right). For any track segment having a length L above 2 meters, the deviation should not exceed 10 mm.

The System Using Laser Scanning Technology

Figure 1A:
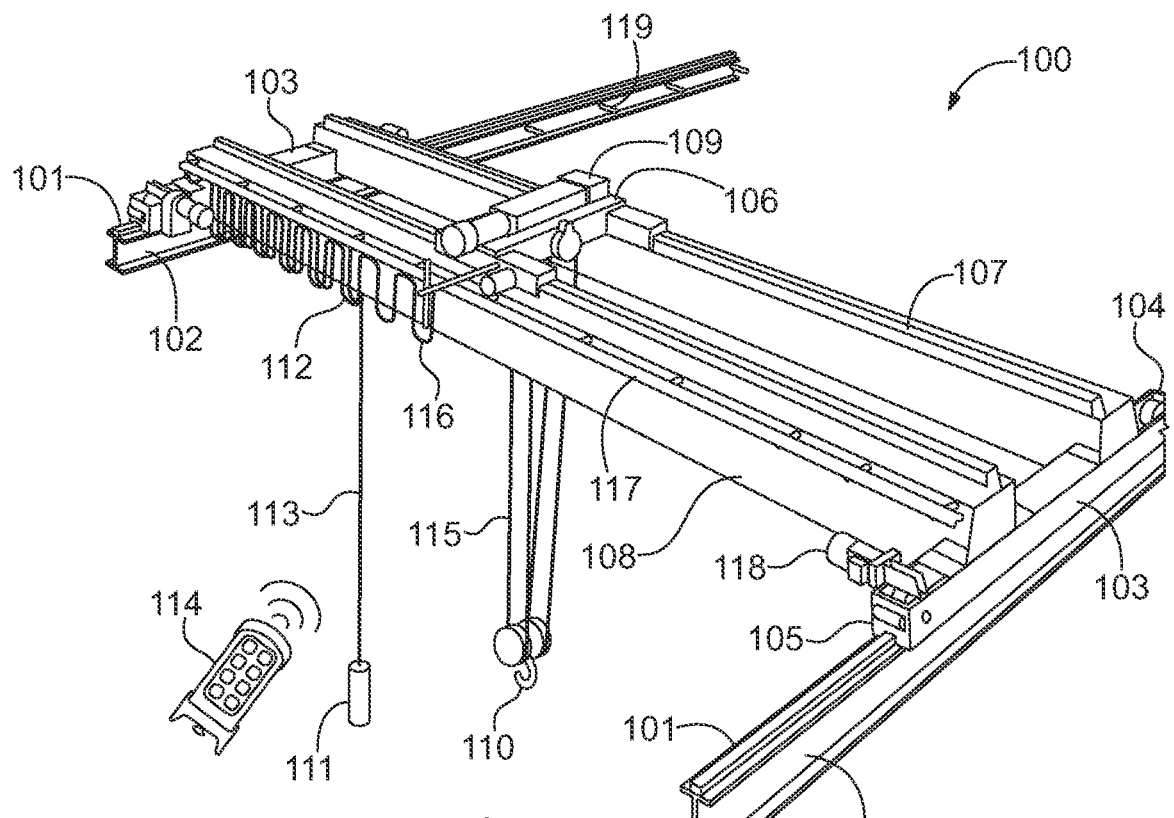
FIG. 1A is a schematic perspective view of an exemplary overhead crane with which exemplary embodiments of the described runway beam and rail survey system can be used.
Figure 1B:
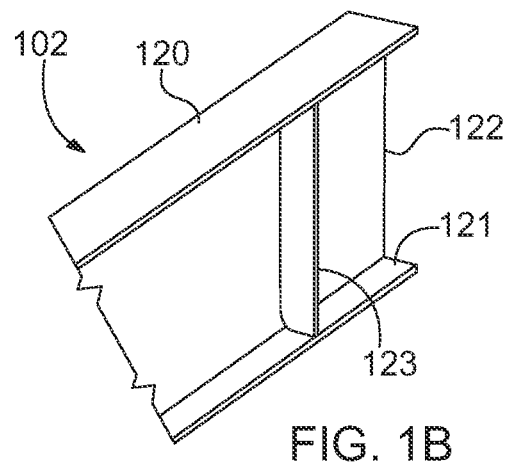
FIG. 1B is a schematic perspective view of an exemplary overhead crane runway beam.
Figure 2C:
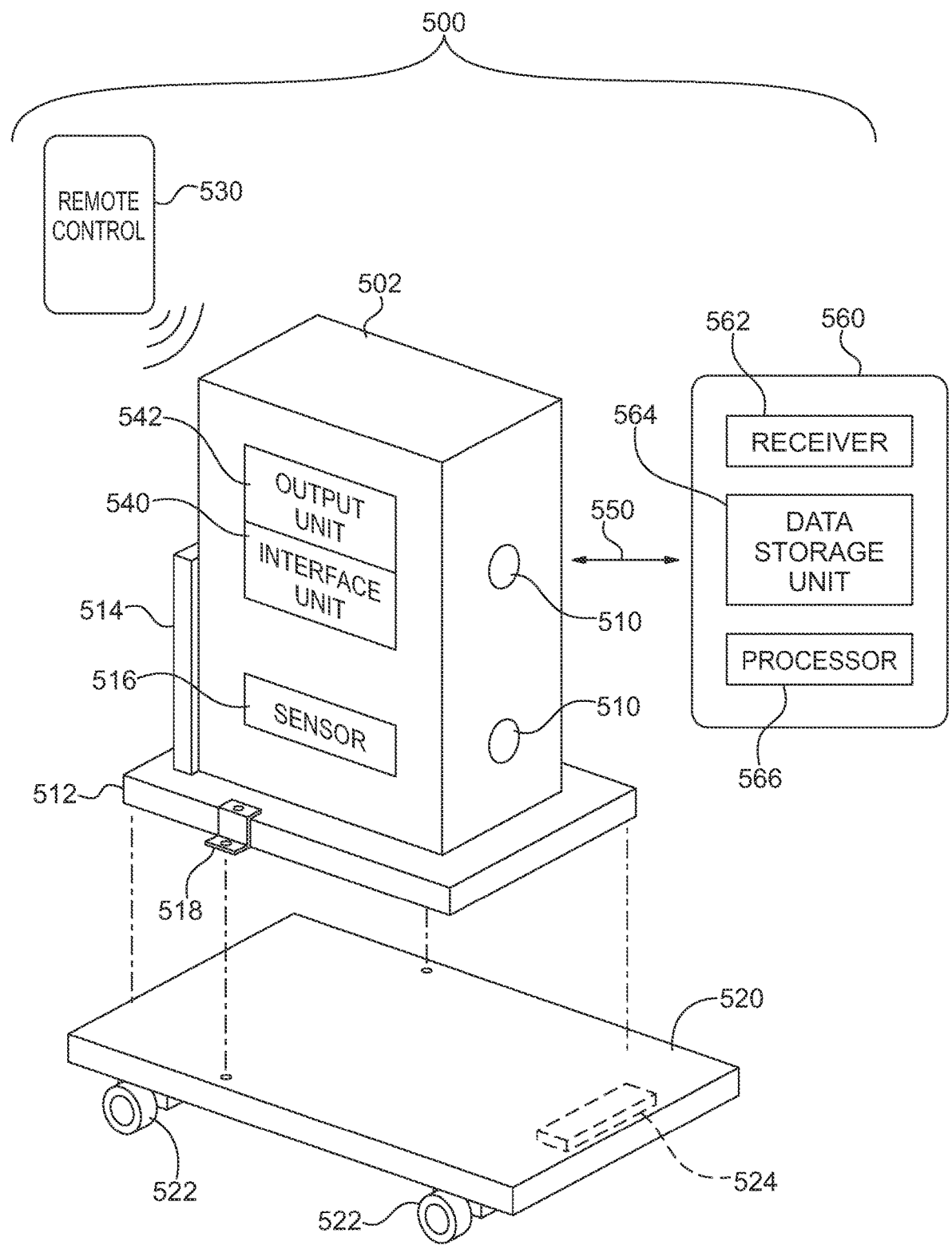
FIG. 2C illustrates schematically an embodiment of the system that uses laser scanning technology to measure components of the overhead crane.

FIG. 2C illustrates schematically an embodiment of the system 500 that uses laser scanning technology to measure components of the overhead crane 100. The embodiments of the disclosed system 500 use a well-known 3D laser scanning technology to collect data on the spatial position of the components of the overhead crane 100 as shown in FIG. 1A, specifically, the runway beam 102 and the runway rail 101. The system comprises a measurement unit 502 including a 3D laser scanning device 510 mounted on a support base 512. Multiple 3D laser scanning devices 510 suitable for use as a component of the system 500 are commercially available and include, without limitation, Z+F IMAGER© 5016, 3D Laser Scanner, FARO FOCUS, and Leica ScanStation P40/P30. In some embodiments, the system 500 is configured to collect the data from the ground and is positioned in the crane bay, optimally on the centerline of the crane bay. In some embodiments, the ground-positioned system 500 comprises a support platform optimized for stationary ground placement, for example a tripod. In some embodiments, the ground-positioned system 500 is configured to be movable and comprises a movable platform, for example a carriage 520 having wheels 522 or a tripod and dolly platform. In some embodiments, the movable platform is powered, for example, with a battery 524 or an electric cord for connection to a conventional outlet. In some embodiments, the movable platform is remotely controlled using a remote control 530.

In some embodiments, the measuring unit 502 of the system 500 further comprises a stabilization element 514 configured to physically level the 3D laser scanning device 510 and to minimize the effects of vibration. Multiple automatic leveling and stabilization elements are known in the art and are described, for example, in U.S. Pat. Nos. 3,123,330; 5,963,749; 5,419,521; 8,938,160; 9,534,730; and 10,315,781. As used in this document, the term "level" refers to a vertical (perpendicular) positioning of the 3D laser scanning device 510 relative to the plane of reference, e.g., the horizontal plane.

In some embodiments, the measuring unit 502 of the system 500 further comprises one or more internal sensors 516 configured to collect the data that can be used to correct for deviations of the measuring unit 502 from the optimal spatial positioning (for example, deviations to vertical positioning relative to the horizontal plane). Such sensors 516 are well known in the art and include, without limitation, acceleration sensors, motion sensors, and tilt sensors, such as dual axis compensators.

In some embodiments, the system 500 is configured to collect the data from the crane 100 and is positioned, for example, on the crane bridge girder (designated 108 in FIG. 1A) or an end carriage (designated 103 in FIG. 1A). In some embodiments, the system 500 is positioned on one of the runway beams (designated 102 in FIG. 1A). In some embodiments, the system 500 comprises an attachment such as a clamp 518 for mounting the support base 512 to the carriage 520, as shown in FIG. 2C, or to the crane bridge girder 108, the runway beam 102, or the end carriage 103.

In some embodiments, the measurement unit 502 further comprises an interface unit 540 which transmits the data collected by the 3D laser scanning device 510 and the internal sensors 516. In some embodiments, the interface unit 540 comprises at least one output unit 542 for outputting data from the internal processes of the measurement unit 502. In some embodiments, the output unit 542 comprises a port for machine readable media. If a line interface is applied, the interface unit 542 typically comprises plug-in units acting as a gateway for information delivered to its external connection points. If a radio interface is applied, the interface unit 540 typically comprises a radio transceiver unit, which includes a transmitter and a receiver, and is also electrically connected to a computing unit 560. Depending on the application, the interface unit 540 may also support more than one type of interface. In some embodiments, the interface is a Network/Wide Area Network/Internet Network that supports data communication and data transfers, represented by the arrows 550 in FIG. 2C, between the measuring unit 502 and the computing unit 560.

In some embodiments, the measuring unit 502 provides raw measurement data, such as a point cloud obtained from the 3D laser scanning device 510. In some embodiments, the measuring unit 502 is configured to pre-process the values into coordinate values of a defined type and/or complement the values with defined metadata.

The data collected by the measuring unit 502 of the system 500 is analyzed by the computing unit 560 comprising a receiver 562 that receives the 3D laser scanner data transmitted by the interface unit 540, a data storage unit 564, and a processor 566 configured to compute one or more of crane rail 3D alignment, crane runway beam 3D alignment, crane runway beam flange camber, crane runway beam web warp and lean, hot rail 3D alignment, crane column 3D position and lean, crane column beam seats, and direct span measurement. In some embodiments, the measuring unit 502 and the computing unit 560 form a single integral assembly. (By "integral" is meant a single piece or a single unitary part that is complete by itself without additional pieces, i.e., the part is of one monolithic piece formed as a unit with another part.) In some embodiments, the computing unit 560 is separate from the measurement unit 502. In some embodiments, the computing unit 560 is positioned remotely from the measuring unit 502. In some embodiments, the computing unit 560 is configured to process the data received from the measuring unit 502 in real time. In some embodiments, the computing unit 560 is configured to store the data received from the measuring unit 502 in the data storage unit 564 for later processing. In some embodiments, the data storage unit 564 of the computing unit 560 stores one or more series of computing instructions related to use and analysis of the rail survey data collected. Several types of data storage units 564 are suitable for use in the context of the system 500, such as a hard-drive or firmware storage.

In some embodiments, the processor 566 of the computing unit 560 includes internal components that allow the processor 566 to communicate with the above-described hardware components to send and receive data and instructions. In some embodiments, suitable processors include a variety of various processors such as dual microprocessors and other multi-processor architectures. In some embodiments, the processor 566 is configured to store a series of computing instructions related to use and analysis of the rail survey data collected. In some embodiments, the processor 566 is configured to access and retrieve a series of computing instructions related to use and analysis of the rail survey data collected from the data storage unit 564. In some embodiments, the processor 566 is further configured to execute a series of computing instructions related to use and analysis of the rail survey data collected. In this manner, upon receiving instructions to perform a rail survey analysis in support of the above-described approach, the processor 566 can apply a series of computational transformations to the data received from the measuring unit 502 via the interface unit 540 and compute any of the parameters listed above.

A 3D scanner can acquire millions of points at high precision. In the disclosed system 500, multiple scans are acquired of the entire runway beam with enough overlap, resulting in a dense point cloud which covers the runway beams 102 and runway rails 101. The point cloud is then referenced to an arbitrary right-handed reference frame located at the center of the bay such that the X-axis is oriented parallel to the runway beam direction and the Z-axis points upward parallel to the plumb direction. Details about several embodiments using the system 500 to scan both the runway beams 102 and runway rails 101 are described below.

Scanning the Runway Beam (First Embodiment)

The point cloud of the runway beam 102 is converted by the system 500 to a triangulated irregular network (TIN) surface. As shown in FIG. 3A, which illustrates a TIN surface 130 produced by conversion of a point cloud of the runway beam 102, the TIN surface 130 is created by connecting the point dataset. The TIN surface 130 creates a continuous surface over areas of low point density. The system then converts the TIN surface 130 to a raster grid image 132 by interpolating values at regular intervals from the TIN surface 130. FIG. 3B illustrates the raster grid image 132 produced by conversion of the TIN surface 130.

FIG. 4A is an image showing the different components of the runway beam 102. Specifically illustrated are a runway beam joint 134 and a plurality of stiffeners 123. The image shows the 3D point cloud of the runway beam 102 converted to a raster form.

The system 500 then performs an edge detection analysis on the image shown in FIG. 4A, which results in the image shown in FIG. 4B. FIG. 4B is a binary image showing the stiffeners 123 and the areas (called panels) 136 between adjacent stiffeners 123 on the web 122 of the runway beam 102. The image shows regular regions of each panel 136. The "+" sign on the image of FIG. 4B shows the location 138 where the column supports the joint 134 between two runway beams 102.

The runway beam joint 134 is where two runway beams 102 are connected. Columns support the runway beams 102 at the joints 134. The joint 134 has a particular pattern and shape which can be seen in the images of FIGS. 4A and 4B. The joint locations are identified semi-automatically by selecting the first two joints 134 manually. Then the system 500 identifies subsequent joints 134 using two criteria: (1) the pattern and shape of a joint; and (2) the manually identified distance between the first two columns. A manual check (and correction, if required) is performed to ensure proper joint identification.

The system 500 processes the points within the extent of each panel 136 to locate the web 122. The system filters the points in this area with reference to the average surface value. Any outliers greater than 90th percentile variation from the mean are removed, resulting in a plane surface. The system 500 then adopts two coloring approaches.

Figure 5A:
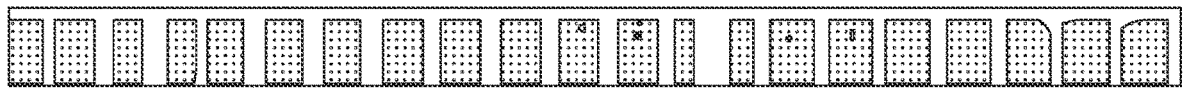
FIG. 5A is a map of the deformations of the web in the panels between adjacent stiffeners with reference to the average value of points between two adjacent stiffeners (each panel is referenced to the average panel's distance to the crane bay centerline)

The first coloring approach maps deformations of the web 122 between two stiffeners 123 (i.e., at the panels 136) with reference to the average value of points between the two stiffeners 123. FIG. 5A illustrates this map. Each panel 136 is referenced to the average panel's distance to the crane bay centerline. FIG. 5A shows the web 122 using a color ramp from blue=−1 inch (−2.5 cm), to green=0, to red=+1 inch (+2.5 cm) deformation. These deformations are from the average point value between two stiffeners 123.

Figure 5B:
FIG. 5B is a map of the deformations of the web in the panels between adjacent stiffeners with reference to the average value of points between two adjacent runway beam joints at which columns support the runway beam (each panel is referenced to the average runway beam's distance to the crane bay centerline, and plus signs demark one section of the runway beam)

The second coloring approach shows the deformation of the web 122 with reference to the average of points between two adjacent runway beam joints 134. FIG. 5B is a map of the deformations of the web 122 in the panels 136 between adjacent stiffeners 123 with reference to the average value of points between two adjacent runway beam joints 134 at which columns support the runway beams 102 (each panel 136 is referenced to the average runway beam's distance to the crane bay centerline, and plus signs demark one section of the runway beam 102). Like FIG. 5A, FIG. 5B shows the web 122 using a color ramp from blue=−1 inch (−2.5 cm), to green=0, to red=+1 inch (+2.5 cm) deformation.

Figure 5C:
FIG. 5C shows the three profiles (bottom, middle, and top locations) along which the distances between the web and the crane bay centerline are measured.

FIG. 5C shows the three profiles (bottom, middle, and top locations) along which the distances between the web 122 and the crane bay centerline are measured. Specifically, the profiles include a bottom profile 140a taken along the bottom of the image, a middle profile 140b taken along the middle of the image, and a top profile 140c taken along the top of the image.

Figure 5D:
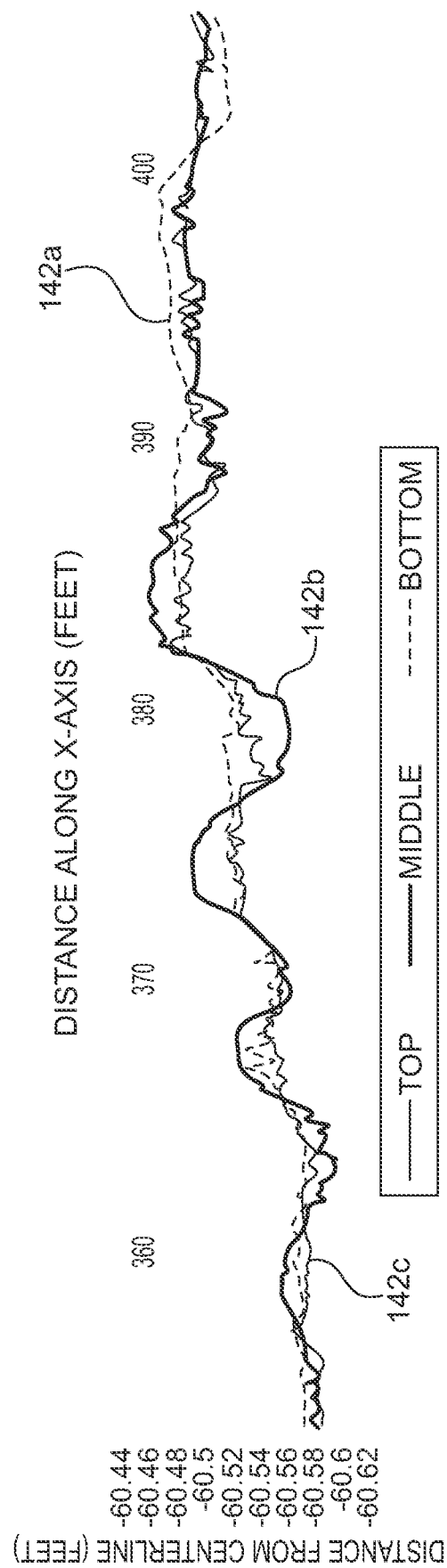
FIG. 5D is a graph of the distances from the runway beam web to the crane bay centerline measured at the bottom, middle, and top locations as shown in FIG. 5C.

FIG. 5D is a graph of the distances (on the ordinate in feet) from the runway beam web 122 to the crane bay centerline measured at the bottom profile 140a, at the middle profile 140b, and at the top profile 140c, as shown in FIG. 5C, versus the distance along the X-axis (on the abscissa also in feet). (The abscissa and the ordinate are the horizontal and vertical axes, respectively, typically the x-axis and y-axis of a two-dimensional graph.) These distances when plotted show the alignment of the web 122 in the X and Z directions (parallel to the bay centerline and in the plumb direction). The curve 142a corresponds to the bottom profile 140a, the curve 142b corresponds to at the middle profile 140b, and the curve 142c corresponds to the top profile 140c.

Scanning the Runway Rail (First Embodiment)

Figure 6A:
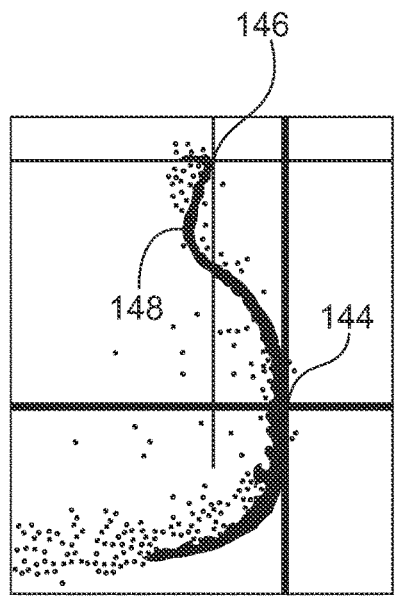
FIG. 6A illustrates an example of an actual point cloud of a runway rail.
Figure 6B:
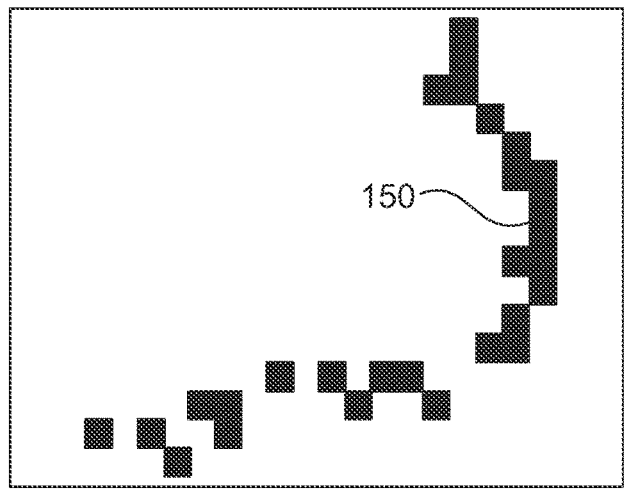
FIG. 6B illustrates a voxel data structure representation of the point cloud shown in FIG. 6A.

The system 500 also performs mapping of the runway rail 101. The goal of rail mapping is to map two important locations: the rail web 126 and the rail head 124 (see FIG. 7A). FIG. 6A illustrates an example of an actual point cloud 148 of a runway rail 101, with the rail web 126 shown as a red "+" or plus sign 144 and the rail head 124 shown as a yellow "+" or plus sign 146, respectively. The system 500 achieves the task of rail mapping by matching a standard section of rail point data and a template of a standard rail section. FIG. 6B illustrates a voxel data representation 150 of the actual point cloud 148 shown in FIG. 6A.

Figure 6C:
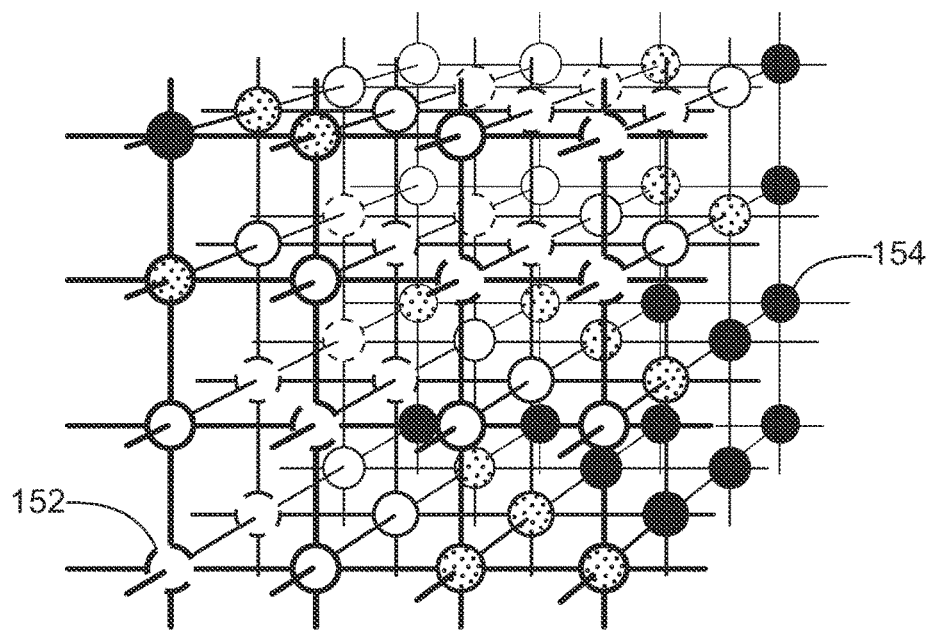
FIG. 6C is a representative illustration of a voxel grid, with each voxel marked as a white or black ball.

The voxel data representation 150 comprises 3D cubes of 0.5 inches (1.25 cm) in dimension (an exemplary representation of unrelated voxel data is shown in FIG. 6C). A modified rectangular voxel can be created, however, such that the Y- and Z-dimensions are 0.4 inches (1 cm) and the X-dimension is 10 inches (25.4 cm). A voxel is like a pixel, which represent a value on a regular grid in three-dimensional space. A Cartesian coordinate system (X, Y, Z) is a coordinate system that specifies each point uniquely in three-dimensional space by three Cartesian numerical coordinates, which are the signed distances to the point from three, fixed, mutually perpendicular directed lines, measured in the same unit of length. Each reference line is called a coordinate axis or just an axis of the system, and the point where they meet is its origin, usually at ordered triplet (0, 0, 0). The coordinates can also be defined as the positions of the perpendicular projections of the point onto the three axes, expressed as signed distances from the origin.

FIG. 6C is a representative illustration of a voxel grid, with each voxel marked as a light ball 152 or a dark ball 154. Every small 3D voxel cube stores the number of points within its extents. In FIG. 6C, every such cube is marked as a white ball 152 whereas the rest are black balls 154.

Figure 7A:
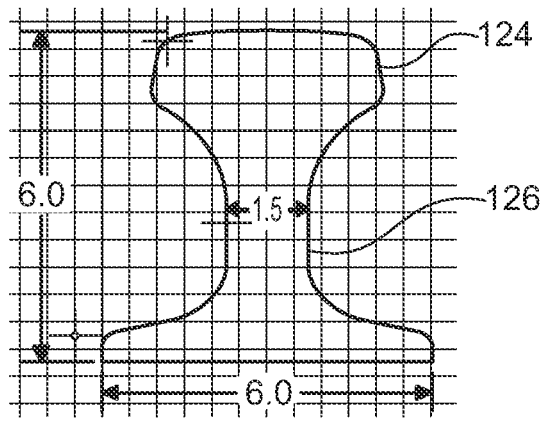
FIG. 7A illustrates standard dimensions of an example template of a complete rail section.
Figure 7B:
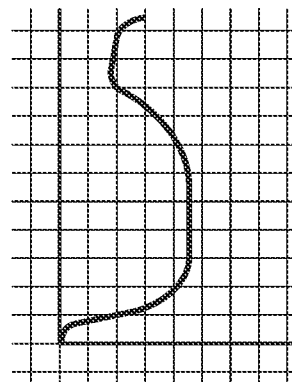
FIG. 7B illustrates a half face of the rail section shown in FIG. 7A.
Figure 7C:
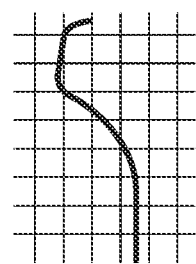
FIG. 7C illustrates the half face of the rail section shown in FIG. 7B without the bottom 2 inches (5 cm)
Figure 7D:
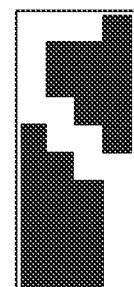
FIG. 7D illustrates the voxel cross section of the rail voxel data structure for the top 4 inches (10 cm) of the half face of the rail section shown in FIG. 7C.

Similarly, the system 500 also converts the standard rail template to a voxel data structure. FIG. 7A illustrates the standard dimensions of an example template of a complete rail section: the rail section has a total height of 6 inches (15.25 cm), a web thickness of 1.5 inches (3.8 cm), and a maximum width defining its footprint of 6 inches (15.25 cm). Only one face of the template is used for matching purposes because 3D point data are available only from one side of the rail as shown in FIG. 7B. FIG. 7B illustrates a half face of the rail section shown in FIG. 7A. Further, only the top 4 inches (10 cm) of the rail data are converted to voxel because the lower portion is covered by clips at regular intervals to hold the rail in place. FIG. 7C illustrates the half face of the rail section shown in FIG. 7B without the bottom 2 inches (5 cm). The resulting voxel cross-section is shown in FIG. 7D. Thus, FIG. 7D illustrates the voxel cross section of the rail voxel data structure for the top 4 inches (10 cm) of the half face of the rail section shown in FIG. 7C.

Figure 8C:
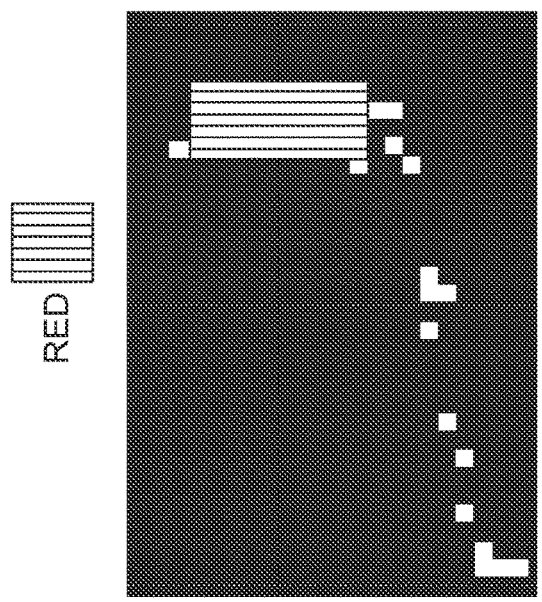
FIG. 8C illustrates the FFT results highlighting the best match and with a rectangular box placed over the best location to identify two important rail locations (the lower right corner of the box identifies the rail web and the upper right corner of the box identifies the rail head)
Figure 8B:
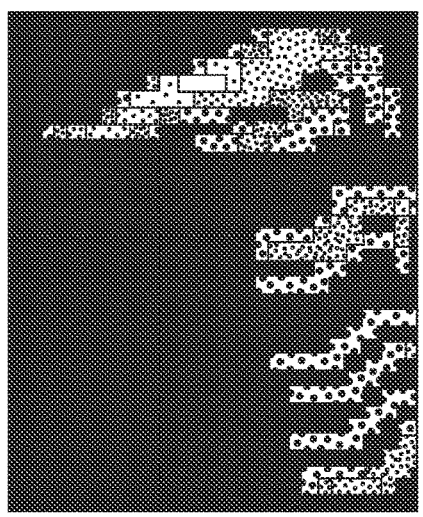
FIG. 8B illustrates the FFT image matching results highlighting the best match between the data of FIG. 8A and the standard rail cross-section.
Figure 8A:
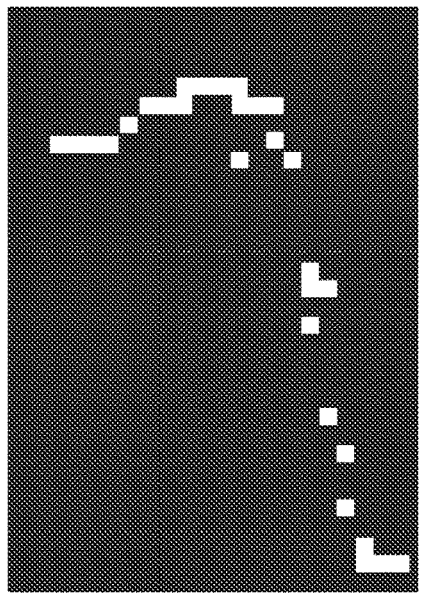
FIG. 8A is a representative example of the cross-section of the runway rail in voxel format.

At this point, both the rail point cloud and the template are in voxel format. At every voxel increment along the length of the rail, the system obtains the cross section as shown in FIG. 8A (which is a representative example of the cross-section of the runway rail in voxel format). The system 500 then uses the cross section to perform a fast-Fourier transform (FFT) image matching. FIG. 8B illustrates the FFT image matching results highlighting the best match between the data of FIG. 8A and the standard rail cross-section. The best match is highlighted in the light color. FIG. 8C illustrates the FFT results highlighting the best match and with a rectangular box placed over the best location to identify the two important rail locations (the lower right corner of the box identifies the rail web 126 and the upper right corner of the box identifies the rail head 124).

Figure 9A:
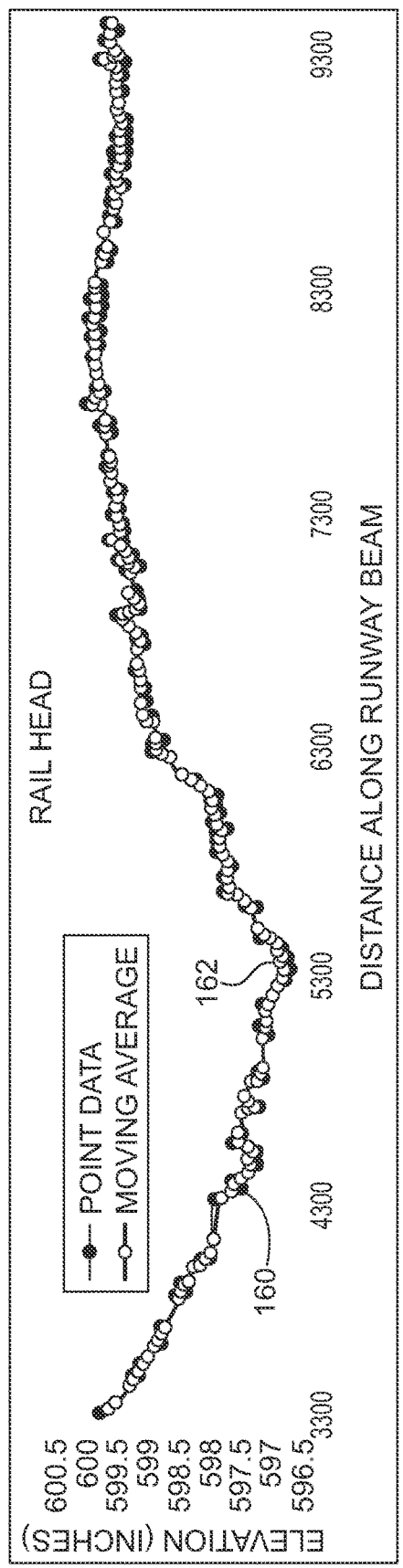
FIG. 9A is a graph of the elevation of the rail head against the distance along the runway beam.
Figure 9B:
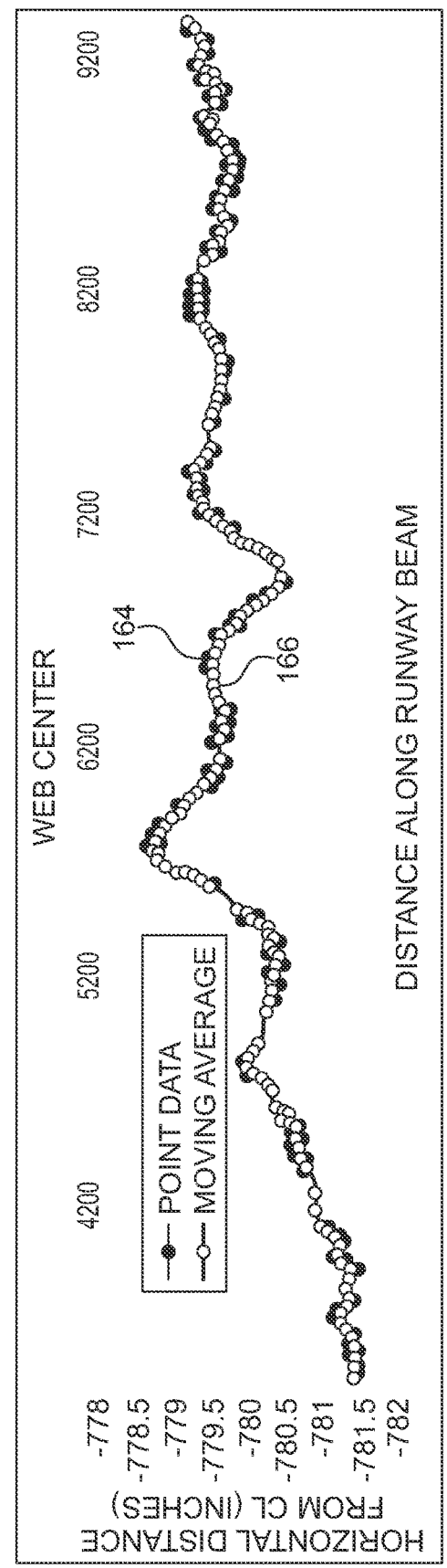
FIG. 9B is a graph of the horizontal distance from the centerline of the web center against the distance along the runway beam.

The system 500 implements the process identified above for the entire length of the runway beam 102 to obtain the locations of the rail web 126 and the rail head 124. The elevations at these locations are plotted in FIGS. 9A and 9B. FIG. 9A is a graph of the elevation of the rail head 124 (on the ordinate in inches) against the distance along the runway beam (on the abscissa). Illustrated are both the point data 160 and the moving average 162. FIG. 9B is a graph of the horizontal distance from the centerline of the web center (on the ordinate in inches) against the distance along the runway beam (on the abscissa). Illustrated are both the point data 164 and the moving average 166.

Figure 10:
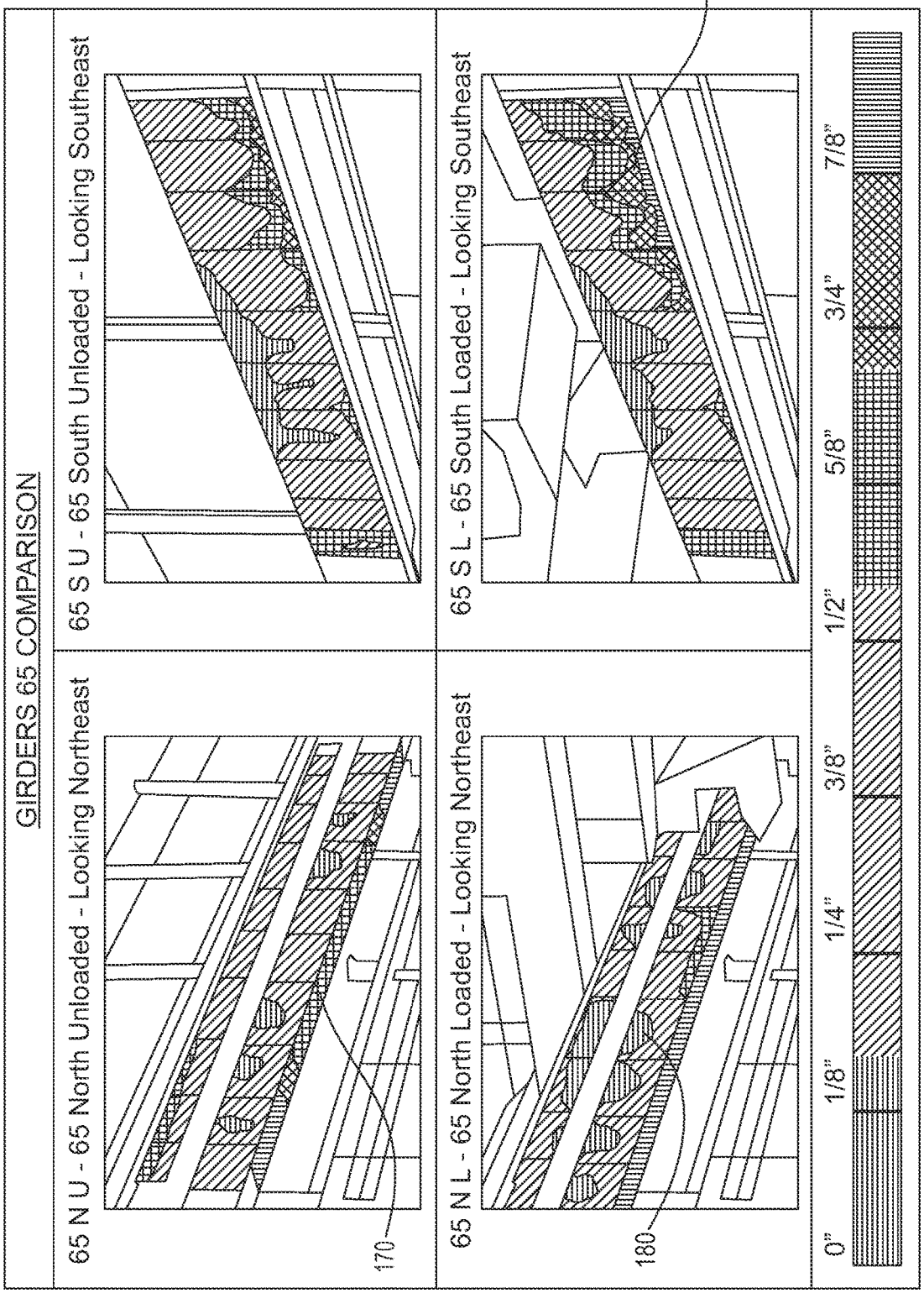
FIG. 10 is a representative map illustrating runway beams with and without load superimposed on a photographic image of an overhead crane.

FIG. 10 is a representative map illustrating runway beams with and without load superimposed on a photographic image of an overhead crane. By applying a color scheme to the shape of the beam, the direction and amount of deflection, roll, camber, or bulging that occurs in the beam can be shown. In the color scheme, red represents an area that deviates 1 inch (2.5 cm) from the minimum deflection value. The top images show the same beam span in a runway, except one is on the north side of the bay and the other is the south side of the bay. The lower images show the same beams, now with a crane and load parked on top of the beam. In the loaded images (bottom images), the user can easily interpret the amount of deflection, roll, camber, or bulging that occurs once a loaded crane is in that area. The top left image illustrates camber 170; the bottom left image illustrates bulging 180; and the bottom right image illustrates roll 190.

Figure 11:
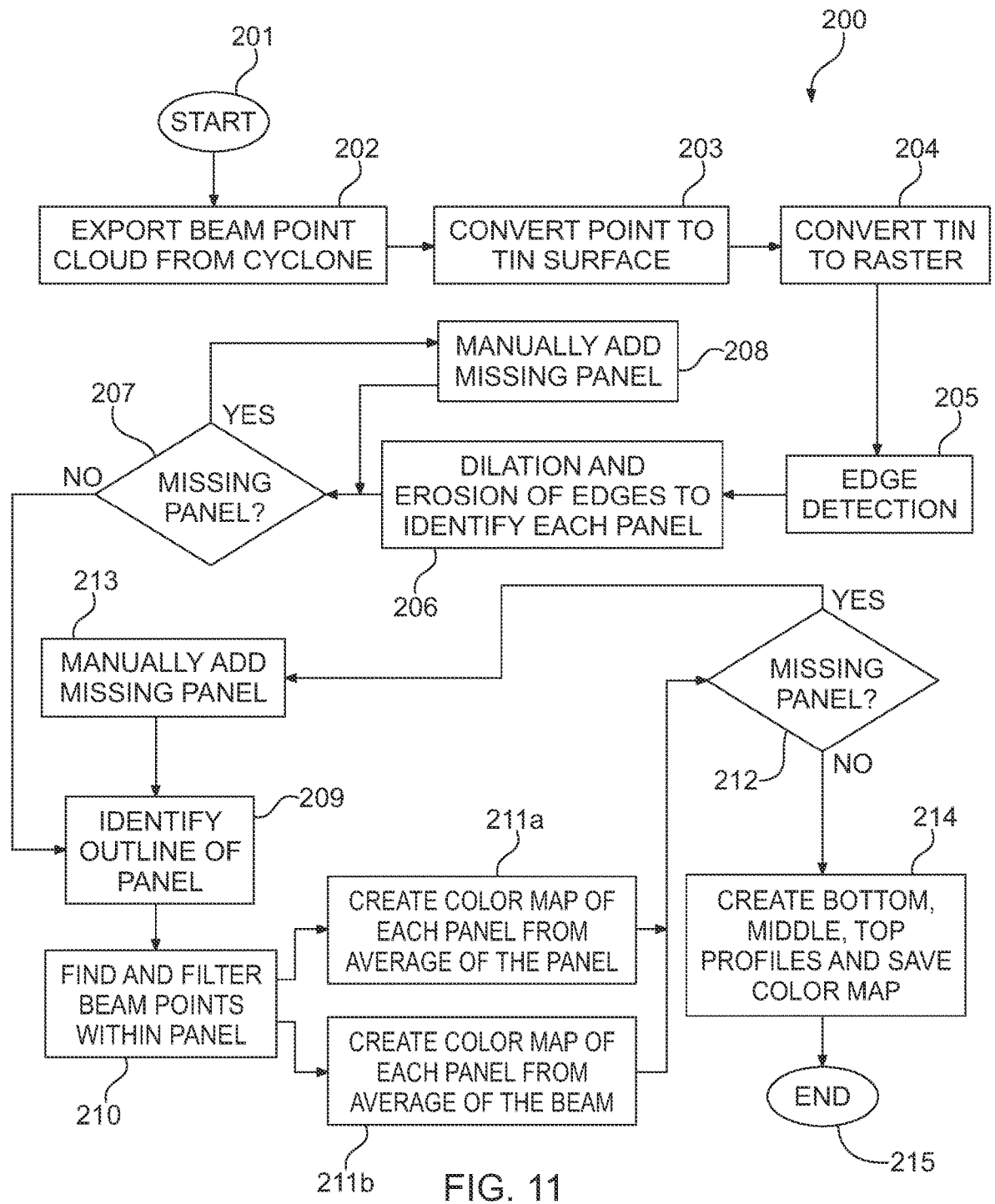
FIG. 11 is flow diagram illustrating an exemplary method of performing a rail survey using information collected from a 3D scanner in the described rail survey system.

FIG. 11 is a flow diagram illustrating an exemplary method 200 of performing a rail survey using information collected using exemplary embodiments of the rail survey system 500 described above. In the method, it is assumed that the measuring unit 502 has been positioned on the ground at the centerline of the overhead crane bay. The method starts at Step 201. As shown in FIG. 11, at Step 202 data are obtained from the 3D laser scanning device 510 of the measuring unit 502 and the point cloud of the runway beam 202 is exported from point cloud processing software. Leica Geosystems Holdings AG of Switzerland sells, under the trademark "Cyclone," the market-leading point cloud processing software. The Cyclone product is a family of software modules that provides a wide set of work process options for 3D laser scanning projects in engineering, surveying, construction, and related applications.

In Step 203, the point cloud of the runway beam 202 is converted to a triangulated irregular network (TIN) surface 130 as shown in FIG. 3A. Several methods of generating a TIN surface are known in the art and described, for example, in the U.S. Pat. Nos. 7,774,381; 7,561,990; and 7,804,498. The TIN surface 130 is subsequently converted, in Step 204, into a raster grid surface 132 (as shown in FIG. 3B) by interpolating values at regular intervals from the TIN surface 130, resulting in an image of the runway beam surface as shown in FIG. 4A.

In Step 205, the image of FIG. 4A is further processed to identify the points corresponding to the runway beam web 122. This is accomplished by detecting the edges of each runway beam panel 136, wherein the upper and lower edges correspond to the upper flange 120 and the lower flange 121 of the runway beam 102 and the lateral edges correspond to the beam stiffeners 123. The points corresponding to the flanges 120 and 121 and the stiffeners 123 are elevated with respect to the web surface. In addition, the beam joints 134 are identified. The edge detection analysis performed in Step 205 on the image shown in FIG. 4A results in the image shown in FIG. 4B.

In Step 206, as shown in FIG. 11, each panel 136 is identified by dilation and erosion of edges. This step removes the outlier points that do not fall on the panel 136, i.e., the step performs a clean-up operation. The data are then visually examined for missing panels 136 at Step 207. Missing panels, if any, are manually added at Step 208 and the method cycles through Steps 207 and 208 until there are no missing panels.

Subsequently, at Step 209, an outline of the panel 136 is identified. The points within each panel 136 are found and filtered, in Step 210, to remove outliers that elevated above or below the surface of runway beam web 122. At the next steps, two types of color maps are created. In Step 211a, a color map is created of each panel 136 from the average of the panels. In Step 211b, a color map is created of each panel 136 from the average runway beam's distance to the crane bay centerline. Examples of the resulting color maps are shown in FIG. 5A and FIG. 5B. In Step 212, the data are visually examined for missing panels 136. Missing panels, if any, are manually identified and added at Step 213 and the method cycles through Steps 209, 210, 211a and 211b, and 212 until there are no missing panels.

In some embodiments, the deviations from the centerline are measured along a longitudinal line spanning the length of the runway beam 102. In some embodiments, the deviation is measured along two longitudinal lines. In some embodiments, the deviation is measured along three longitudinal lines. In some embodiments, the deviation is measured along more than three longitudinal lines. An exemplary arrangement of three measuring lines or profiles 140a, 140b, and 140c is illustrated in FIG. 5C. In Step 214, as shown in FIG. 11, the profiles 140a, 140b, and 140c are created and the color maps are saved. The method 200 then ends at Step 215. In some embodiments, the deviation data obtained along each line or profile can be presented in a graph form (see FIG. 5D). In some embodiments, the color maps can be superimposed on a photographic image as shown in FIG. 11.

In some embodiments, the data and the processing method 200 described above can also be used to survey alignment of a crane hot rail and of the position and lean of runway beam support columns. In some embodiments, the data can be used to identify deformations in the crane runway beam, crane hot rail, or crane support columns. The discoverable deformations include, but are not limited to, bending, buckling, warping, and twisting. In some embodiments, these data can be also used to identify the possible presence of cracking in runway beams, hot rails, or support columns and in evaluating the reparability of deformed sections.

In some embodiments, the survey system 500 is configured to measure the 3D alignment of the runway rails 101. In the method described below, it is assumed that the measuring unit 502 has been positioned on the bridge girder 108 (see FIG. 1A), an end carriage 103, or on one of the runway beams 102 and acquires a point cloud of the crane runway rail 101. FIG. 6A illustrates an example of an actual point cloud 148 of a runway rail 101. In some embodiments, for analysis of runway rail 3D alignment, the processor 566 is configured to convert the runway rail point cloud transmitted from the measuring unit 502 into a voxel data representation 150 as shown in FIG. 6B. In some embodiments, the voxel data are used to construct a voxel grid as shown in FIG. 6C. In some embodiments, the voxel data are used for volume rendering. In some embodiments, the voxel data are used to extract an isosurface using a matching cubes algorithm.

In some embodiments, the processor 566 is further configured to compare the voxel dataset obtained from a 3D runway rail survey to a reference voxel dataset obtained from a reference rail (FIG. 7A) that has been pre-loaded into the data storage unit 564 of the computing unit 560. In some embodiments, the reference dataset is obtained by scanning the entire face of a reference rail (FIG. 7B). In some embodiments, the reference dataset is obtained from a segment of a face of the reference rail. In some embodiments, the scanned segment of the reference rail encompasses the rail head 124 and rail web 126 (FIG. 7C). A representative voxel data set obtained from a reference rail is shown in FIG. 7D.

In some embodiments, the processor 566 is configured to compare voxel datasets using computational image matching. Multiple methods of computational image matching that are suitable for the present analysis are known in the art, including but not limited to scale invariant feature transform (SIFT), speed up robust feature (SURF), robust independent elementary features (BRIEF), oriented FAST, rotated BRIEF (ORB), discrete Fourier transform (DFT), discrete cosine transform (DCT), fast Fourier transform (FFT), inverse fast Fourier transform (I-FFT), and random sample consensus (RANSAC). In a preferred embodiment, an FFT image matching approach is used (see FIGS. 8A-C).

In some embodiments, the deviation between a reference dataset and a survey dataset can be presented in a graph form (see FIGS. 9A and 9B). In some embodiments, the color maps can be superimposed on a photographic image. In some embodiments, the data and the processing method described above can be used to identify deformations in the crane runway rail 101. The discoverable deformations include, but are not limited to, bending, buckling, warping, and twisting. In some embodiments, these data can also be used to identify the presence of cracking in the runway rail 101, hot rail, or support columns and in evaluating the feasibility of repairing the deformed section.

In some embodiments, the processor 566 is further configured to receive the spatial positioning data from the measuring unit 502 (e.g., tilt angle) and, if the position of the measuring unit 502 is not optimal (e.g., vertical), to use these data to correct the 3D laser scanner measurements for deviations. In some embodiments, tilt of the measuring unit 502 is corrected by measuring a tilt angle between the reference plane of the support base 512 and the plane perpendicular to the ambient gravitational force.

In some embodiments, the crane-mounted measuring system 500 further comprises the motion sensor 516 and is configured to sense the movement of the bridge rail 107 and to automatically activate and collect the data every time the bridge rail 107 is stationary. Motion sensors suitable for use with the disclosed system are known in the art and are described, for example, in U.S. Pat. Nos. 10,257,499; 10,157,535; 9,983,025; 9,900,669; 9,863,767; 9,789,393; 9,726,516; 8,854,544; 8,631,701; 8,416,094; 8,410,774; 8,393,214; 8,354,643; and 8,314,390.

In some embodiments, the system 500 is further configured to generate reports and/or alarms for crane operating and monitoring personnel via, for example, one or more network-connected crane operator workstations or consoles, as a result of determining that applicable crane specification requirements have been exceeded.

Also disclosed in this document are methods of non-contact measuring of 3-D alignment of an overhead crane runway beam 102 having an upper flange 120 and a lower flange 121 linked by a beam web 122 and having a plurality of vertical beam web stiffeners 123 positioned along the beam 102 at intervals. A runway rail 101 is positioned on top of the runway beam 102. The method comprises: providing a measurement unit 502 configured to remain stationary during measurement of two runway rails 101 which collectively form a runway, wherein the measurement unit 502 includes a 3-D laser scanning device 510 on a support base 512; acquiring a point cloud 148 of a segment of the crane runway beam 102; converting the point cloud 148 into a triangulated irregular network (TIN) surface 130; converting the TIN surface 130 into a raster image; detecting edges of beam web surface segments, wherein each beam web surface segment is delineated by upper and lower runway beam flanges in the vertical dimension and by runway beam stiffeners in the horizontal dimension; identifying runway beam joints 134; determining an average value of points between two adjacent runway beam joints 134; determining an average value of points for each beam web surface segment; measuring the distance from each web surface segment to a crane bay centerline at the bottom, middle, and top locations along the runway beam 102; and determining the deviation between either the distance from the crane bay centerline and the average value of points between two adjacent runway beam joints 134 or the distance from the crane bay centerline and each beam web surface segment at the top, bottom, and middle locations, wherein when the deviation exceeds a pre-determined threshold the runway beams 102 are not aligned, and wherein when the deviation is at or below the pre-determined threshold the runway beams 102 are aligned. By "pre-determined" is meant determined beforehand, so that the predetermined characteristic (e.g., the threshold) must be determined, i.e., chosen or at least known, in advance of some event (e.g., the start of the method).

The present disclosure further provides methods of non-contact measuring of 3-D alignment of an overhead crane runway rail 101. An example method comprises: providing a measurement unit 502 configured to remain stationary during measurement of two runway rails 101 which collectively form a runway, wherein the measurement unit 502 includes a 3-D laser scanning device 510 on a support base 512; acquiring a point cloud of a segment of the crane runway rail; converting the point cloud into a voxel data structure; obtaining a cross section of the crane runway rail; obtaining a cross section of a reference rail from a reference rail voxel data structure; performing a fast-Fourier transform (FFT) image matching between the voxel data structure and the reference rail voxel data structure; and determining the deviation between the cross section of the crane runway rail 101 and the reference rail cross section, wherein when the deviation exceeds a pre-determined threshold the runway rails 101 are not aligned, and wherein when the deviation is at or below the pre-determined threshold the runway rails 101 are aligned.

In some embodiments, the method comprises placing the measuring unit 502 on the ground in the crane bay, optimally at the centerline of the crane bay. In some embodiments, the method further comprises collecting multiple datasets after placing the measuring unit 502 in a plurality of positions within the crane bay. In some embodiments, the measuring unit 502 positions are distributed along the length of the crane bay and cover different segments of the crane runway beam 102 or the crane runway rail 101. In some embodiments, the method comprises placing the measuring unit 502 on the bridge girder 108. In some embodiments, the method comprises placing the measuring unit 502 on the crane end carriage 103.

In some embodiments, when the measuring unit 502 is placed on the crane bridge girder 108 or on the crane end carriage 103, the method comprises collecting multiple datasets, wherein each dataset is collected from one of a plurality of positions on the crane bridge girder 108 along the crane runway rail 101. In some embodiments, when the measuring unit 502 is placed on the crane bridge girder 108 or on the crane end carriage 103, the method comprises collecting a dataset at every crane stop during movement of the crane bridge girder 108 along the crane runway rail 101. In some embodiments, when the measuring unit 502 is placed on the crane bridge girder 108 or on the crane end carriage 103, the method comprises automatic activation of the measuring unit 502 at every stop during movement of the crane bridge girder 108 along the crane runway rail 101. In some embodiments, when the measuring unit 502 is placed on the crane bridge girder 108 or on the crane end carriage 103, the method comprises manual activation of the measuring unit 502 at preselected positions along the crane runway rail 101. The process of collecting data at various points may be repeated until a measurement has been collected at every pre-selected survey point desired. In some embodiments, the measuring unit 502 is placed to collect data from contiguous segments of the crane runway beam 102 or the crane runway rail 101. In some embodiments, the measuring unit 502 is placed to collect data from overlapping segments of the crane runway beam 102 or the crane runway rail 101. In some embodiments, the data collection continues until the entire length of the crane runway beam 102 or the crane runway rail 101 has been covered.

In some embodiments, the method comprises collecting data from one of the two crane runway beams 102 or one of the two runway rails 101. In some embodiments, the method comprises collecting data from a first crane runway beam 102 or a first crane runway rail 101 followed by the collection of data from the second crane runway beam 102 or the second crane runway rail 101. In some embodiments, the method comprises collecting at least two datasets from each segment of each crane runway beam 102 or each crane runway rail 101. In some embodiments, the method comprises collecting the first dataset when the crane bridge girder 108 is positioned over the segment of the runway beam 102 or the runway rail 101 under examination and further collecting the second dataset when the crane bridge girder 108 is not positioned over the segment of the runway beam 102 or runway rail 101 under examination.

In some embodiments, the method further comprises calibrating and leveling the measuring unit 502 before data collection. In some embodiments, the leveling of the measuring unit 502 comprises measuring the tilt angle of the measuring unit. In some embodiments, the tilt angle is the angle between the reference plane of the support base 512 and the plane perpendicular to the ambient gravitational force.

In some embodiments, the disclosed methods further comprise analyzing the data collected by the measuring unit 502 as described above. In some embodiments, the methods further comprise combining the analysis outputs from the first crane runway beam 102 and the second crane runway beam 102 to measure the runway beam span variation over the length of the crane bay. In some embodiments, the methods further comprise combining the analysis outputs from the first crane runway rail 101 and the second crane runway rail 101 to measure the runway rail span variation over the length of the crane bay. In some embodiments, the data measured from the runway beams 102 and the runway rails 101 are further combined to assess the degree to which the crane track is straight. A representative result of the combined data analysis is shown in FIG. 10. In some embodiments, the methods advantageously comprise surveying the alignment of the crane runway beam 102 or the crane runway rail 101 without interrupting or suspending crane operation.

Scanning the Runway Beam (Alternative Embodiment)

In an alternative method of using the system 500 to measure the runway beam 102, the method begins as does the first embodiment discussed above. In summary, multiple scans are acquired over the entire area with sufficient overlap to create a dense point cloud which covers the beams 102 and the rails 101. The point cloud is then referenced to an arbitrary right-hand reference frame located at the center of the bay. The X-axis is oriented parallel to the beam direction and the Z-axis points upward parallel to the plumb direction.

As illustrated in FIG. 4B, which is a binary image showing the stiffeners 123 and the areas (called panels) 136 between adjacent stiffeners 123 on the web 122 of the runway beam 102, the point cloud is processed to locate the webs 122 and the areas 136 between webs. The points in the areas 136 are filtered to the average surface value. Any outlier points greater than the 90th percentile variation from the mean are removed, resulting in a plane surface.

Two coloring approaches are adopted. The first coloring approach maps deformations of the web 122 between two stiffeners 123 (i.e., at the panels 136) with reference to the average value of points between the two stiffeners 123. FIG. 5A illustrates this map. Each panel 136 is referenced to the average panel's distance to the crane bay centerline. FIG. 5A shows the web 122 using a color ramp from blue=−1 inch (−2.5 cm), to green=0, to red=+1 inch (+2.5 cm) deformation. These deformations are from the average point value between two stiffeners 123.

The second coloring approach shows the deformation of the web 122 with reference to the average of points between two adjacent runway beam joints 134. FIG. 5B is a map of the deformations of the web 122 in the panels 136 between adjacent stiffeners 123 with reference to the average value of points between two adjacent runway beam joints 134 at which columns support the runway beams 102 (each panel 136 is referenced to the average runway beam's distance to the crane bay centerline, and plus signs demark one section of the runway beam 102). Like FIG. 5A, FIG. 5B shows the web 122 using a color ramp from blue=−1 inch (−2.5 cm), to green=0, to red=+1 inch (+2.5 cm) deformation. These deformations are from the average point value between two columns. The column locations are shown by a red "+."

Figure 12:
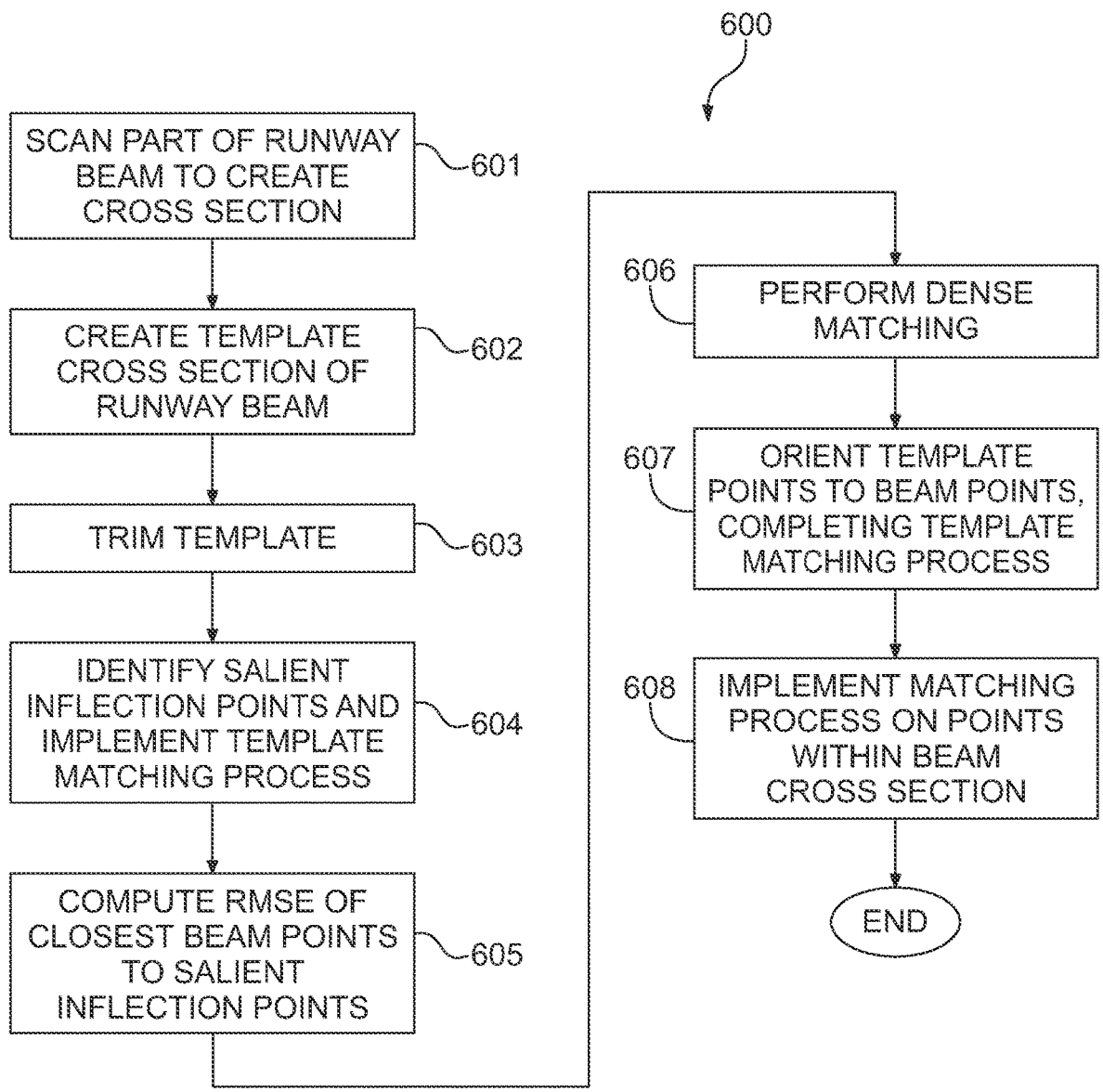
FIG. 12 is a flow chart illustrating the steps of an alternative method of determining locations on the web of a runway beam to be measured.

FIG. 5C shows the three profiles (bottom, middle, and top locations) along which the distances between the web 122 and the crane bay centerline are measured. Specifically, the profiles include a bottom profile 140*a* taken along the bottom of the image, a middle profile 140*b* taken along the middle of the image, and a top profile 140*c* taken along the top of the image. These locations on the web 122 were determined by implementing the following sequential steps of a method 600, as illustrated in the flow chart of FIG. 12.

Figure 13:
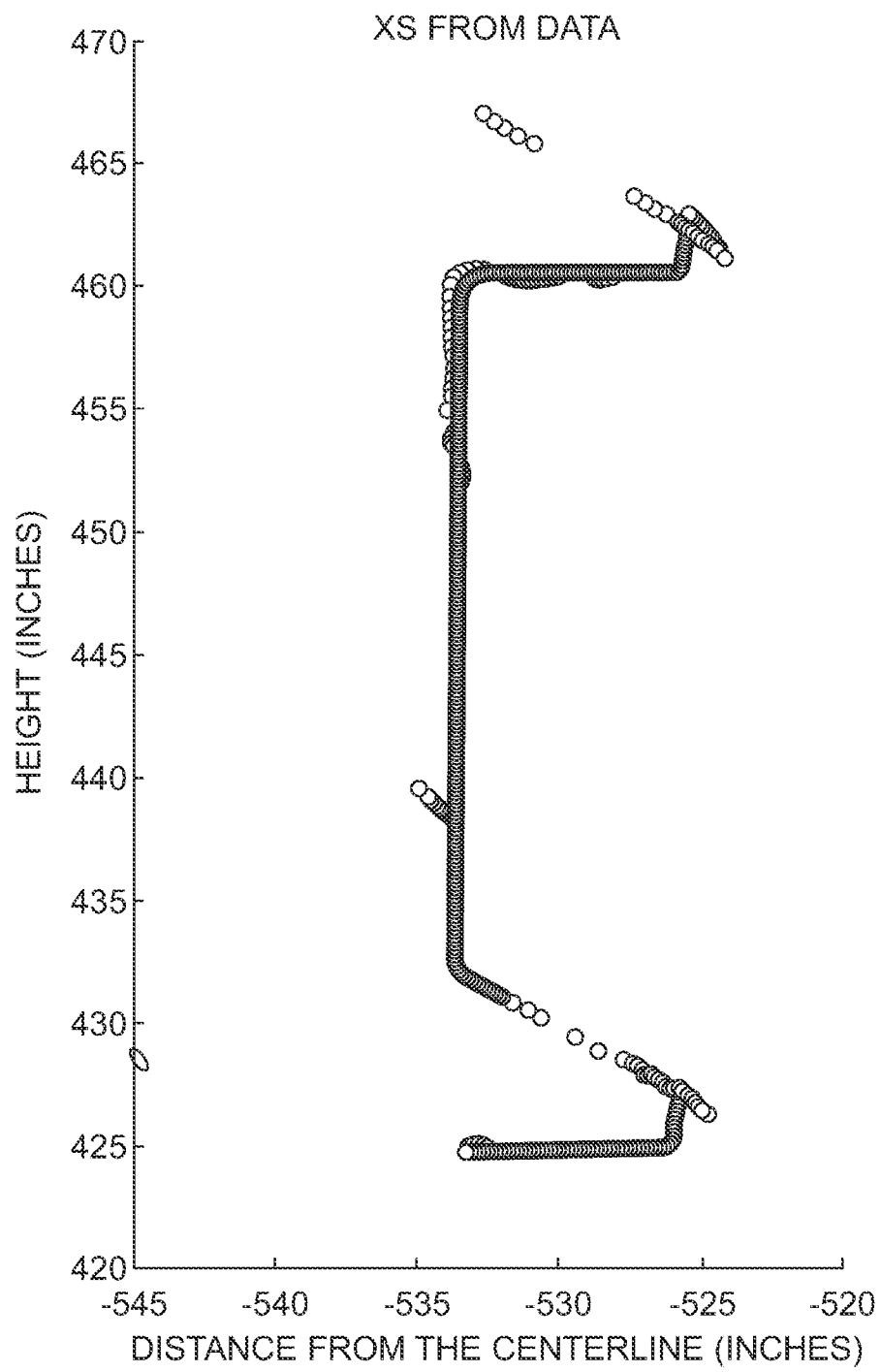
FIG. 13 is an actual scan of part of a runway beam, resulting in a cross section of the beam, as part of an alternative method of performing a survey of the beam.

In the first step 601 of the sequential method, a scan of part of the actual runway beam 102 results in the cross section of the beam 102 that is shown in FIG. 13. FIG. 13 is a graph plotting data points reflecting height (in inches) against the distance from the centerline (in inches). Only one side (the right-hand side) of the beam 102 is scanned. The data shown are a 3-inch (7.6 cm) cross-sectional view of the points on one face of the beam 102. The following matching process is implemented by sequentially processing 3 inches (7.6 cm) of beam data at one time.

Figure 14:
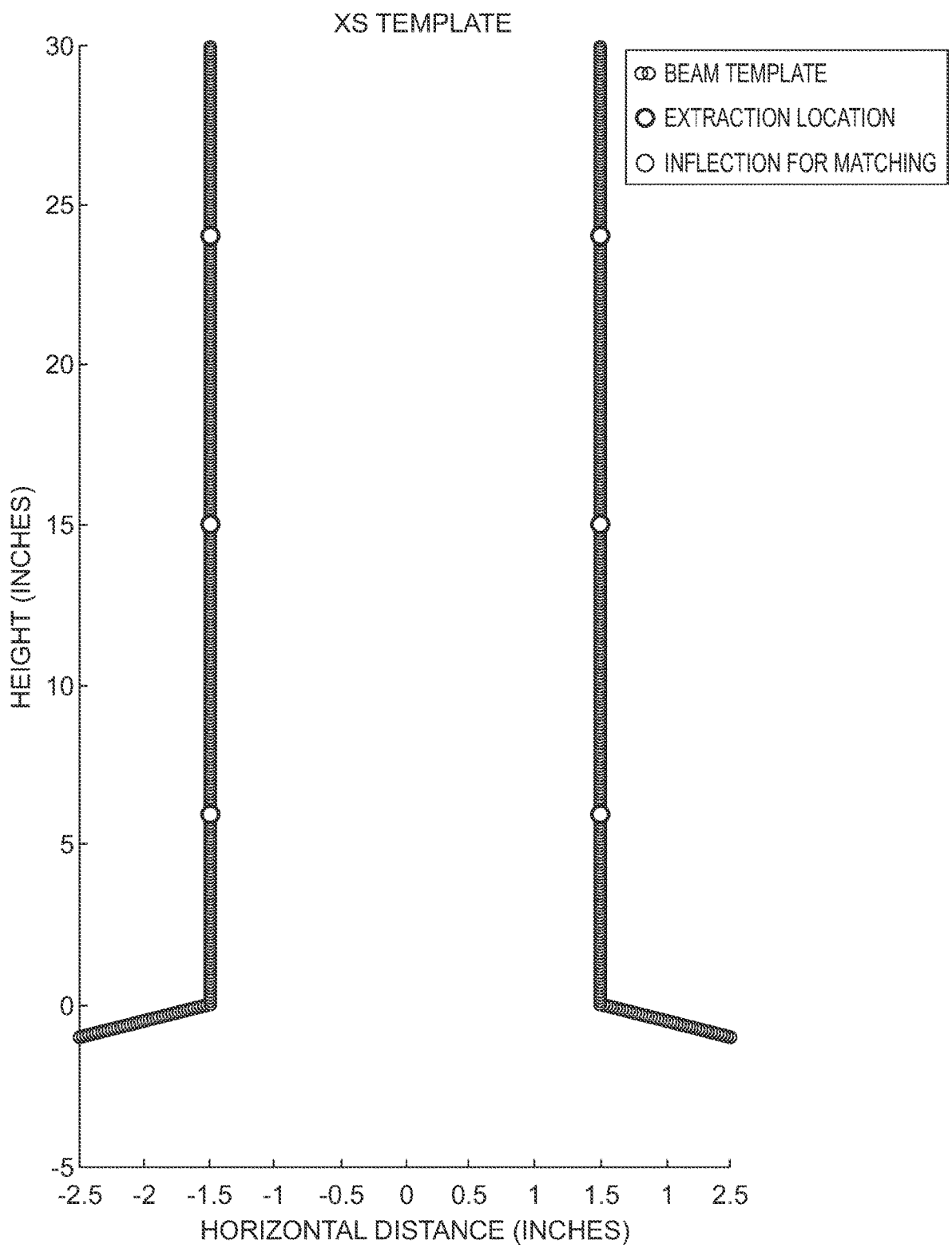
FIG. 14 is a template cross-section of points of the beam, created in another step of the alternative method of performing a survey of the beam.

In the second step 602 of the sequential method, a template cross section of the beam 102 is created with points at every 0.01 feet (0.30 cm) as shown in FIG. 14. Like FIG. 13, FIG. 14 is a graph plotting data points reflecting height (in inches) against the distance from the centerline (in inches). Six points (three on each side of the graph) are labeled "Infection for Matching." The bottom (20% from bottom), middle (center), and top (20% from top) location points are labeled "Extraction Location" and are placed with reference to the size of the beam 102. These points are not visible in the graph because the points labeled "Rail Template" converge or overlap the location points to form a straight line.

In the third step 603 of the sequential method, the template illustrated in FIG. 14 is trimmed to approximately resemble the shape of the cross section of the beam 102. The trimmed template is illustrated in FIG. 15.

Figure 15:
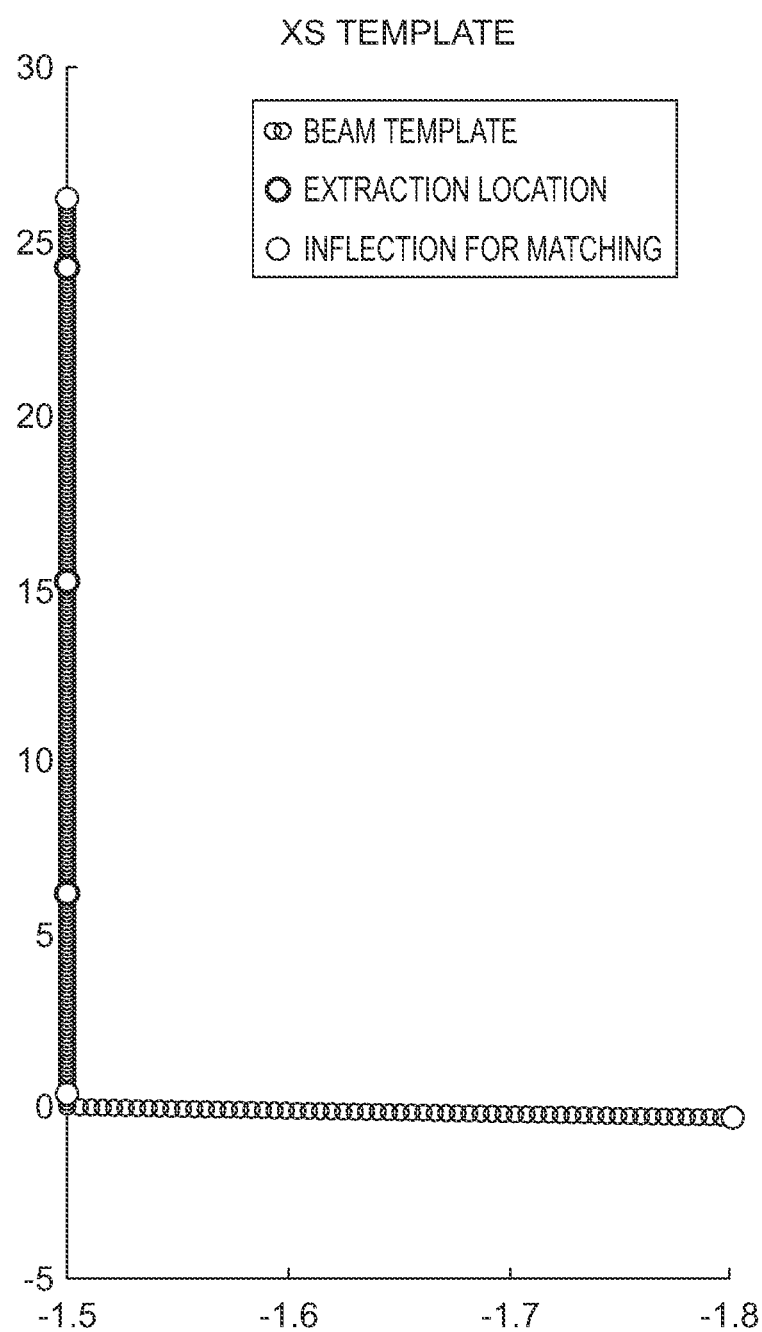
FIG. 15 shows the template illustrated in FIG. 14 trimmed to approximately resemble the shape of the cross section of the beam in another step of the alternative method of performing a survey of the beam.

In the fourth step 604 of the sequential method, three salient inflection points are identified on the template beam as shown in FIG. 15, namely, the points {0,0}; {0, 26}; and {−1.8, 0}. The spatial relationship between the template points and the salient inflection points is maintained throughout the process. A three-step template matching process is implemented to orient the template points to the beam points. In the first step of the template matching process (step 605 of the sequential method), the bottom-most salient inflection point is placed on the bottom-most beam point and the root-mean-square deviation (RMSD) or root-mean-square error (RMSE) of the closest beam points to the salient inflection points is computed. This process is repeated for all beam points from the bottom to the top. Beam point locations with a RMSE value below a predetermined threshold are considered as a candidate location for dense matching.

The RMSD or RMSE is a frequently used measure of the differences between values (sample or population values) predicted by a model or an estimator and the values observed. The RMSE represents the square root of the second sample moment of the differences between predicted values and observed values or the quadratic mean of these differences. These deviations are called residuals when the calculations are performed over the data sample that was used for estimation and are called errors (or prediction errors) when computed out-of-sample. The RMSE serves to aggregate the magnitudes of the errors in predictions for various data points into a single measure of predictive power. RMSE is a measure of accuracy, to compare forecasting errors of different models for a particular dataset and not between datasets, as it is scale dependent.

In the second step of the template matching process (step 606 of the sequential method), dense matching is performed by comparing all template points with the beam points. The beam point with the least RMSE is considered as the matching location. Because the bottom, middle, and top point locations are known with reference to the template, these locations are thus identified, and the horizontal distance is measured.

In the third and final step of the template matching process (step 607 of the sequential method), an affine transformation model is used to orient the template points to the beam points.

In Euclidean geometry, an affine transformation, or an affinity (from the Latin "*affinis*" meaning "connected with"), is a geometric transformation that preserves lines and parallelism (but not necessarily distances and angles). More generally, an affine transformation is an automorphism of an affine space (Euclidean spaces are specific affine spaces), that is, a function which maps an affine space onto itself while preserving both the dimension of any affine subspaces (meaning that it sends points to points, lines to lines, planes to planes, and so on) and the ratios of the lengths of parallel line segments. Consequently, sets of parallel affine subspaces remain parallel after an affine transformation. An affine transformation does not necessarily preserve angles between lines or distances between points, although it does preserve ratios of distances between points lying on a straight line. If x is the point set of an affine space, then every affine transformation on x can be represented as the composition of a linear transformation on x and a translation of x. Unlike a purely linear transformation, an affine transformation need not preserve the origin of the affine space. Thus, every linear transformation is affine, but not every affine transformation is linear.

Figure 16:
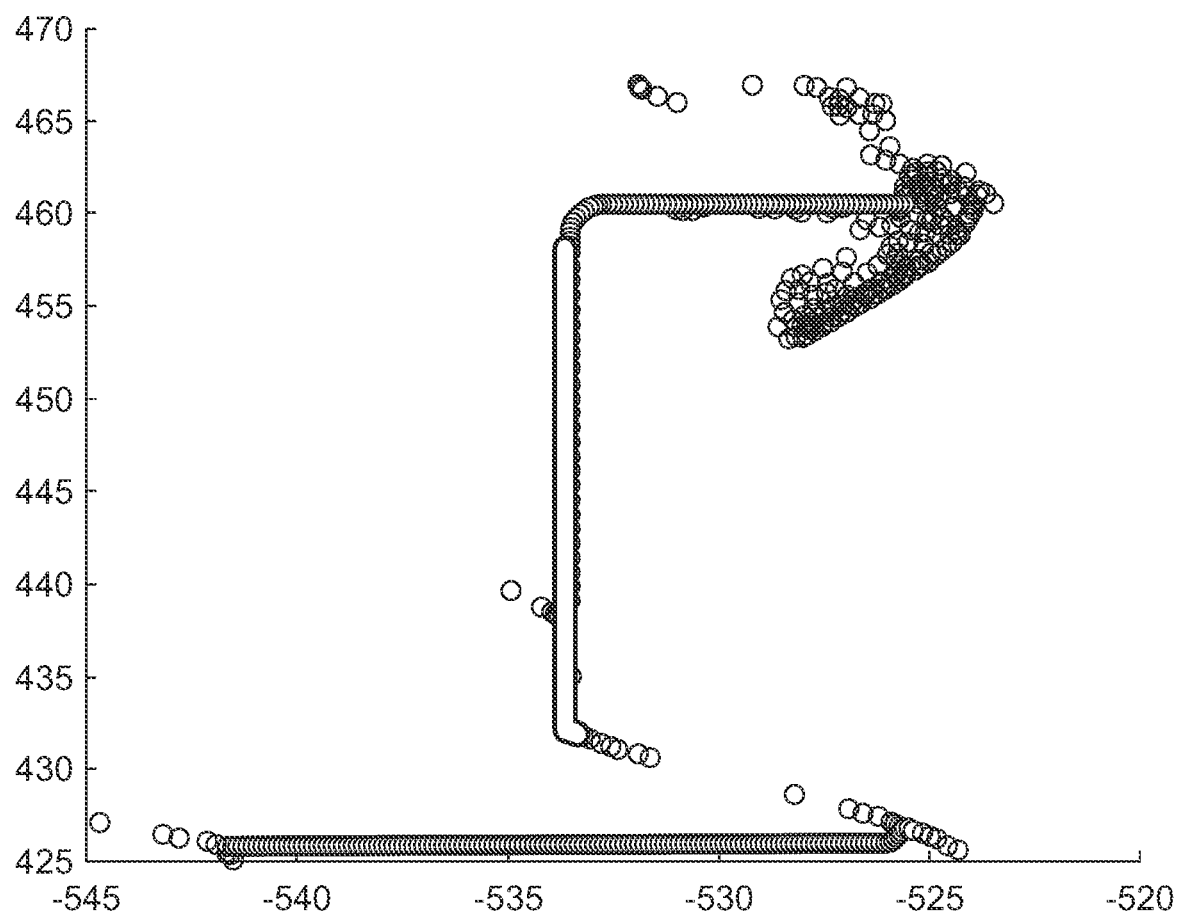
FIG. 16 graphically illustrates the result of applying a three-step template matching process to orient the template beam points to the actual beam points (i.e., the template points are fitted to the actual points) in another step of the alternative method of performing a survey of the beam.

The specific affine transformation model used in step 607 of the sequential method to orient the template points to the beam points is:

$$a_1 x_t + a_2 z_t + a_3 = x_d$$

$$a_4 x_t + a_5 z_t + a_6 = z_d$$

where $x_t$ and $z_t$ are the coordinates of template points, $x_d$ and $z_d$ are the coordinates of the nearest beam points, and $a_1$ through $a_6$ are the affine transformation parameters. The above process is implemented to allow the template to rotate and shift to best fit the beam points. The result is shown graphically in FIG. 16 (which can be compared to FIG. 13).

Figure 17:
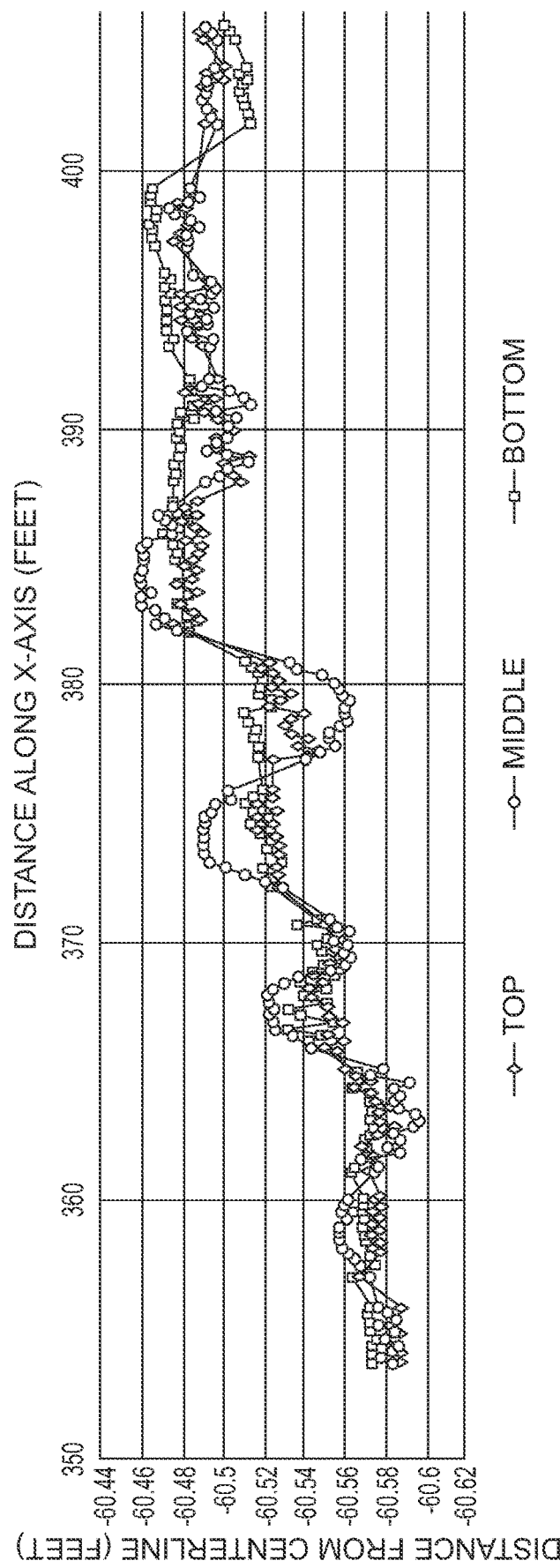
FIG. 17 is a graph of the distances from the runway beam web to the crane bay centerline measured at the bottom, middle, and top locations, showing the alignment of the web in the X-direction (parallel to the bay centerline) and in the Z-direction (plumb direction), upon completing the alternative method of performing a survey of the beam.

In the eighth step 608 of the sequential method, the three-step matching process described above is implemented on beam points within a 3-inch (7.6-cm) cross section as explained in step 601 above. The 3-inch (7.6 cm) data are processed to obtain the three locations every one foot (30 cm) along the length of the beam 102. These distances when plotted in FIG. 17 show the alignment of the web in the X-direction (parallel to the bay centerline) and in the Z-direction (plumb direction). The data reflect some improvement by the alternative embodiment over the initial embodiment of scanning the runway beam 102. Compare FIG. 17 to FIG. 5D.

Scanning the Runway Rail (Alternative Embodiment)

Figure 18:
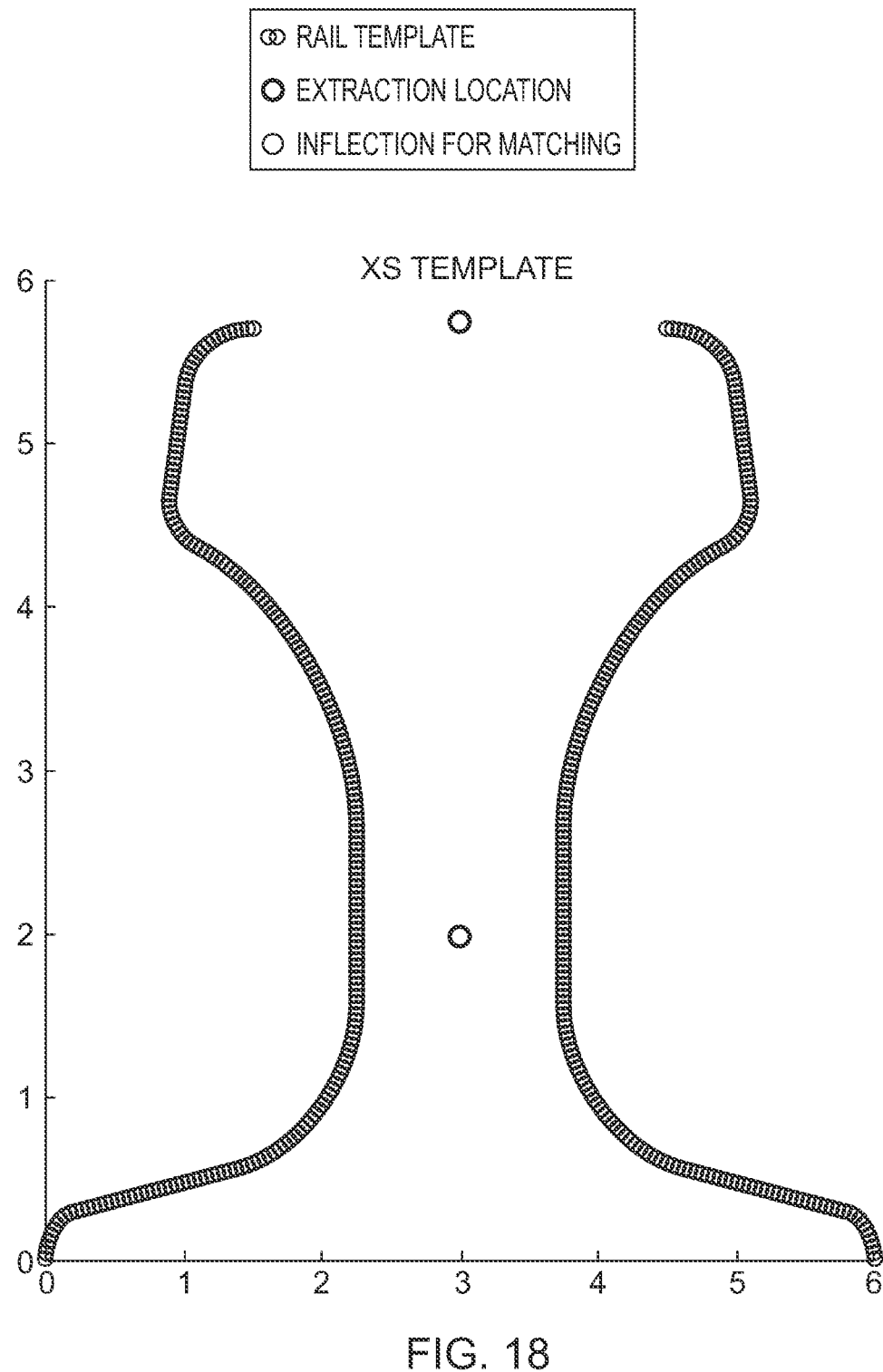
FIG. 18 is a template cross-section of points of a runway rail, created as part of an alternative method of performing a survey of the rail.

An alternative method of using the system 500 to measure the runway rail 101 parallels the alternative method of measuring the runway beam 102 discussed above. More specifically, the three-step template matching process used in the beam extraction (steps 605, 606, and 607) is used in the rail extraction. In the first step of the sequential alternative method of measuring the runway rail 101, a template cross-section of points of the rail 101 as shown in FIG. 18 is created. FIG. 18 for the rail 101 is parallel to FIG. 14 for the beam 102.

Figure 19:
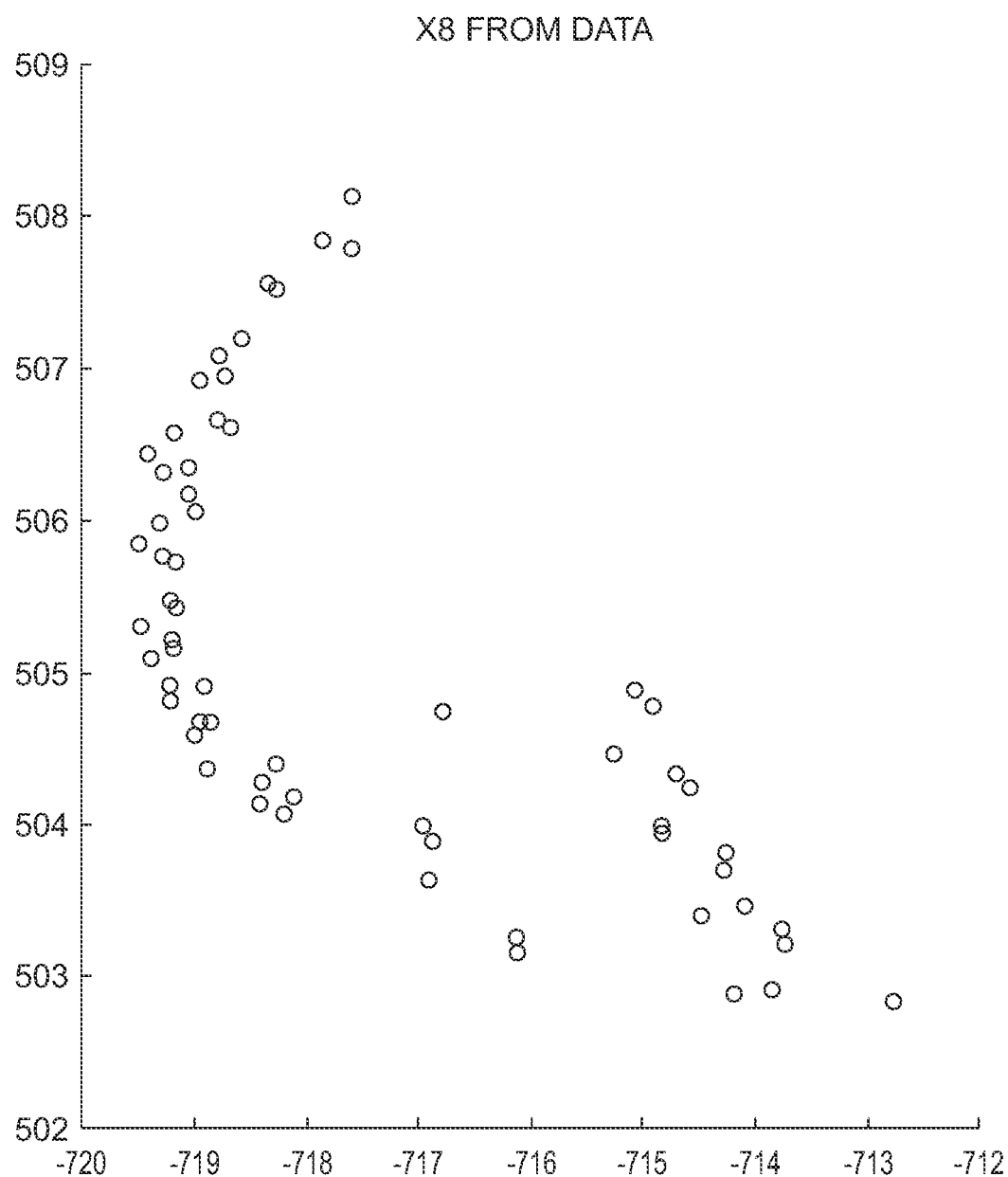
FIG. 19 is an actual scan of part of the runway rail, resulting in a cross section of the rail, in another step of the alternative method of performing a survey of the rail.

In the second step of the sequential method, an actual scan of part of the runway rail 101 results in a cross section of the rail 101. Only one side (the right-hand side) of the rail 101 was scanned. The result is shown in FIG. 19. FIG. 19 for the rail 101 is parallel to FIG. 13 for the beam 102.

Figure 20:
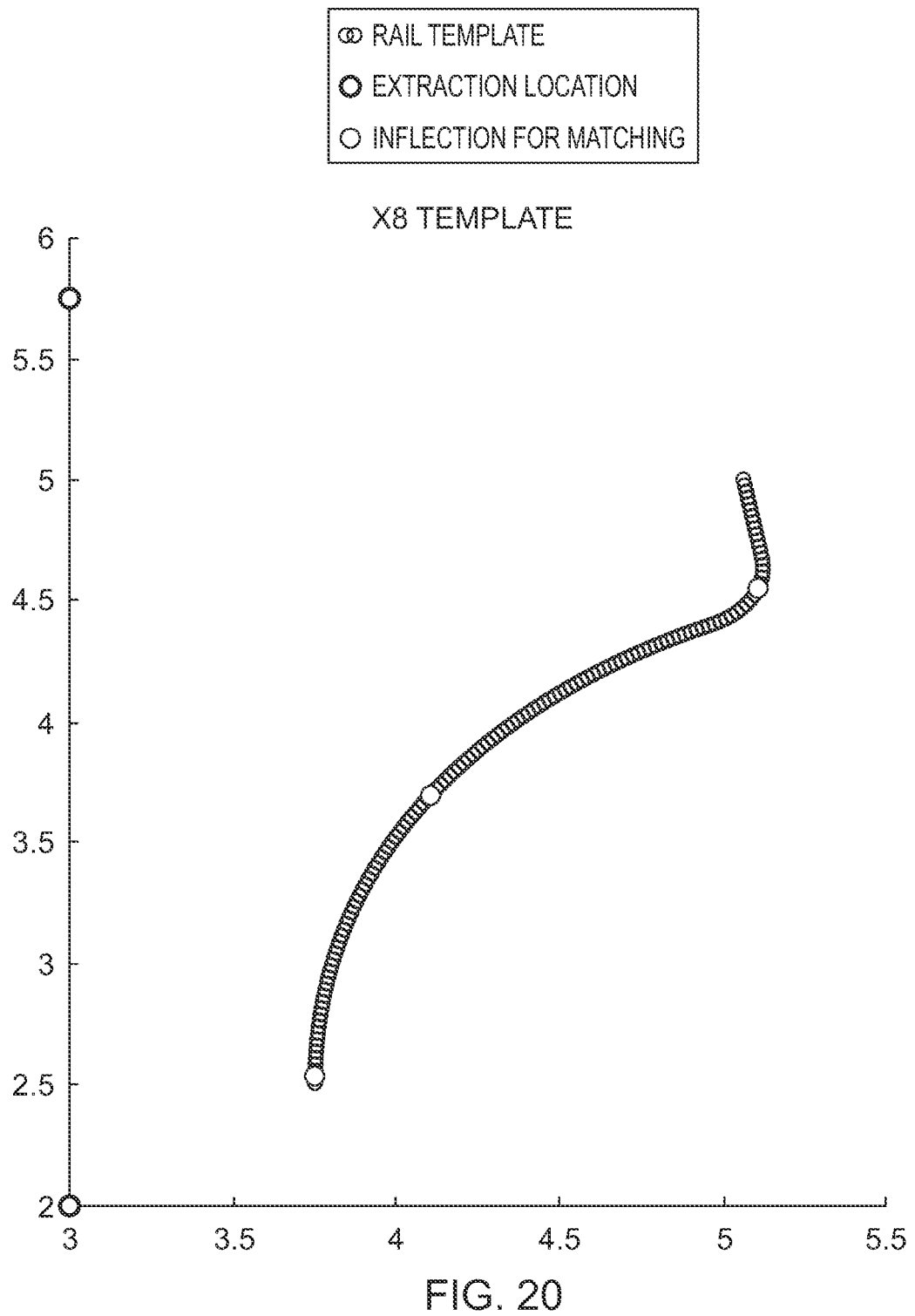
FIG. 20 shows the template illustrated in FIG. 18 trimmed to approximately resemble the shape of the cross section of the rail in another step of the alternative method of performing a survey of the rail.

In the third step of the sequential method, the template illustrated in FIG. 18 is trimmed to approximately resemble (i.e., match) the shape of the cross section of the rail data shown in FIG. 19. The trimmed template is illustrated in FIG. 20. FIG. 20 for the rail 101 is parallel to FIG. 15 for the beam 102.

Figure 21:
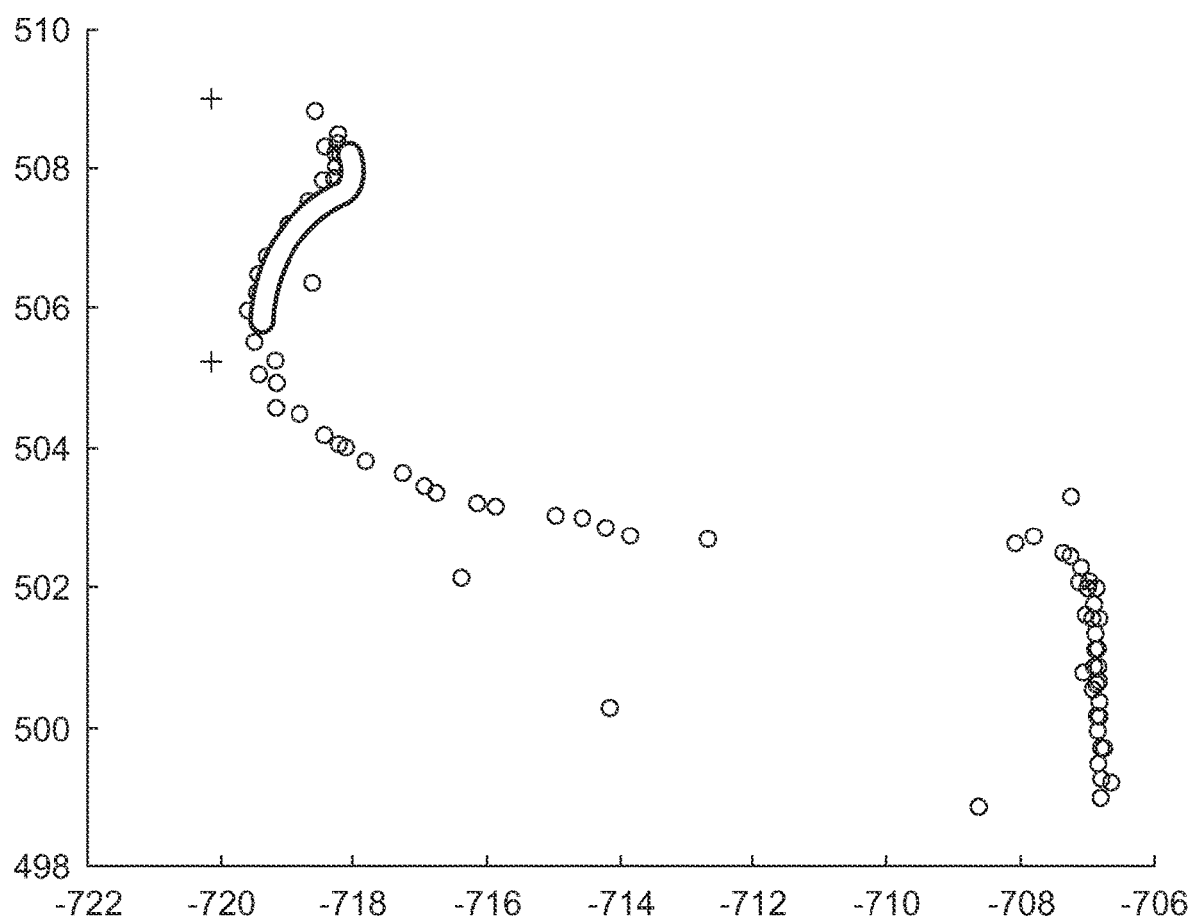
FIG. 21 graphically illustrates the result of applying a three-step template matching process to orient the template rail points to the actual rail points (i.e., the template points are fitted to the actual points) in another step of the alternative method of performing a survey of the rail.

Next, the three-step template matching process is implemented to orient the template points to the rail points. The result is shown graphically in FIG. 21 (which can be compared to FIG. 19). FIG. 21 for the rail 101 is parallel to FIG. 16 for the beam 102. The data reflect a significant amount of improvement by the alternative embodiment over the initial embodiment of scanning the runway rail 101 (and more improvement than was observed for the alternative embodiment over the initial embodiment of scanning the runway beam 102). The term "significant," as used in this document, is a descriptive term that characterizes an amount and means "of a noticeably or measurably large amount." It will be appreciated that the embodiments described above and illustrated in the figures represent only a few of the many ways of collecting and analyzing beam and rail survey data. The described methods and systems are not limited to the specific embodiments described in this document; rather, they include any system and method for the collection of overhead crane rail survey data that includes use of a rail survey carriage that is selectively pushed or pulled by the rail sweep of an overhead crane.

Conventional survey methods required upwards of 24 hours of downtime to collect data on runway rail, runway beam, and column geometries. The Konecranes USA rail rider system reduced this time to nominally 12 hours. In contrast, the disclosed rail survey system has already shown it is possible to collect all information in 4 hours.

Conventional survey methods required manpower access to the crane runway rail and runway beam. In contrast, the disclosed rail survey system has already shown it is possible to collect all information without requiring access to the crane runway rail or runway beam. Conventional survey methods also used contact measurement systems. In contrast, the disclosed rail survey system allows all measurements to be taken without contacting any of the components of the overhead crane.

Conventional survey methods generally do not take direct span measurements; rather, they generally measure one side of the crane bay and then measure the other side. They then rely on algorithms to calculate the span. The time delay in collecting the rail alignment introduces errors into the span calculations. Movement in the building structure can cause significant differences, for example, between the span calculation and the actual span distance. Sources of movement in the building structure can include thermal loading, wind loading, and crane loading from crane operations in adjacent bays. In contrast, the disclosed rail survey system directly measures the rail span and runway beam span, mitigating the deleterious effects of thermal loading, wind loading, and crane loading. Other conventional survey methods generally use a rail targeting method which introduces centering errors.

Having described preferred embodiments of the rail survey system and methods for collecting and processing rail survey data, it is believed that various modifications, improvements, substitutes, or the like will be suggested to those skilled in the art in view of the teachings set forth in this document. Therefore, it should be understood that all such modifications, improvements, substitutes, and the like are believed to fall within the scope of the disclosure. Although specific terms are used, they are used in their ordinary and accustomed manner only, unless defined differently in this document, and not for purposes of limitation.

What is claimed:

1. A non-contact method for measuring 3-D alignment of an overhead crane runway beam or runway rail of an overhead crane, the method comprising:
   (a). providing a separate measurement unit configured to remain stationary during measurement of two rails which collectively form a runway, wherein the separate measurement unit includes a 3-D laser scanner on a support base and no component of the separate measurement unit is positioned on or contacts any of the components of the overhead crane such that the separate measurement unit collects all information without requiring access to the overhead crane or to its overhead crane runway beam or runway rail.

2. The method according to claim 1, wherein the measurement unit is positioned on the centerline of the crane bay.

3. The method according to claim 1, wherein the measurement unit is positioned on the crane bridge girder.

4. The method according to claim 3, wherein the measurement unit comprises a motion sensor and is configured to collect data automatically when the crane movement along the crane rail stops.

5. The method according to claim 1, wherein the measuring unit further includes a dual axis compensator and the data are corrected for the tilt of the measuring unit.

6. The method according to claim 5, wherein the tilt of the measuring unit is corrected by measuring a tilt angle between the reference plane of the support base and the plane perpendicular to the ambient gravitational force.

7. The method according to claim 1, wherein the spatial relationship between the template points and the salient inflection points is maintained throughout the template matching process.

8. The method according to claim 1, wherein the affine transformation model used is:

$$a_1 x_t + a_2 z_t + a_3 = x_d$$

$$a_4 x_t + a_5 z_t + a_6 = z_d$$

where $x_t$ and $z_t$ are the coordinates of the template points, $x_d$ and $z_d$ are the coordinates of the nearest beam or rail points, and $a_1$ through $a_6$ are the affine transformation parameters.

9. The method according to claim 1, wherein the crane is operational while data are being collected.

\* \* \* \* \*